(12) United States Patent
Farahani et al.

(10) Patent No.: US 8,702,441 B2
(45) Date of Patent: Apr. 22, 2014

(54) INTERNAL CONNECTION RETENTION COMPONENTS FOR COMPUTING DEVICES

(75) Inventors: Houtan R. Farahani, San Ramon, CA (US); George V. Anastas, San Carlos, CA (US); Larry A. Barham, Fremont, CA (US); Todd F. Gotham, Campbell, CA (US); Min C. Kim, San Jose, CA (US); George M. Simmel, Cupertino, CA (US); Gregory A. Springer, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/244,123

(22) Filed: Sep. 23, 2011

(65) Prior Publication Data

US 2013/0077234 A1    Mar. 28, 2013

(51) Int. Cl.
*H01R 13/62* (2006.01)

(52) U.S. Cl.
USPC .......................................... 439/371; 439/345

(58) Field of Classification Search
USPC ........ 439/371, 372, 926, 347, 370, 357, 76.2, 439/502
See application file for complete search history.

(56) References Cited

U.S. PATENT DOCUMENTS

| | | | |
|---|---|---|---|
| 6,459,590 B2 * | 10/2002 | Malnati | 361/752 |
| 6,491,541 B2 * | 12/2002 | Wakino | 439/451 |
| 6,544,047 B2 | 4/2003 | Moore | |
| 6,982,871 B2 * | 1/2006 | Tran et al. | 361/679.4 |
| 7,156,683 B2 | 1/2007 | Gupta et al. | |
| 7,354,297 B2 * | 4/2008 | Tsukashima et al. | 439/449 |
| 7,384,304 B1 * | 6/2008 | Fawcett | 439/567 |
| 7,652,888 B2 | 1/2010 | Bohlinger et al. | |
| 7,878,855 B2 | 2/2011 | Li | |

OTHER PUBLICATIONS

Anonymous, "Molex DisplayPort Interconnect System Datasheet", http://www.molex.com/molex/products/family?key=displayport&channel=products&chanName=family&pageTitle=Introduction#applications, 2008.

* cited by examiner

*Primary Examiner* — Phuong Dinh
(74) *Attorney, Agent, or Firm* — Womble Carlyle Sandridge & Rice LLP

(57) ABSTRACT

A computing device includes a Mini DisplayPort or other standardized plug and port connection that is fully internalized within the full device housing. The port can be affixed or coupled to a printed circuit board, with a display cable having a mating plug that is plugged into the port. To prevent the inadvertent uncoupling of the plug from the port, one or more clips, clamps, fixtures, or other cable retention components can hold the cable and/or plug in place at or near where the plug inserts into the Mini DisplayPort or other standardized communication port. Added stability to the cable can also be provided at or near such location.

15 Claims, 14 Drawing Sheets

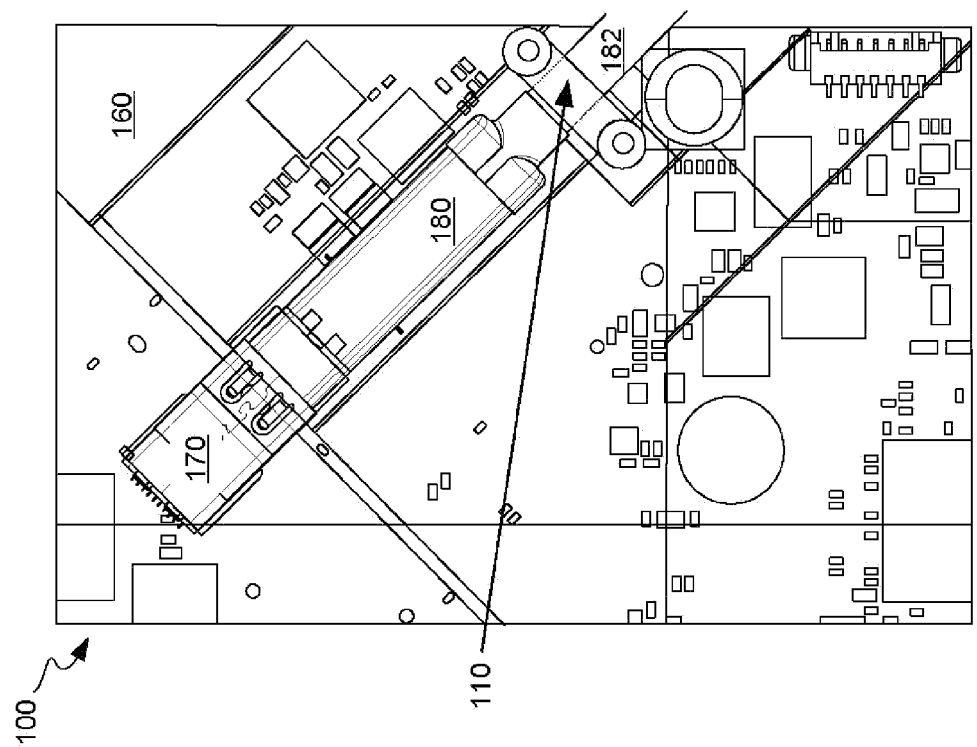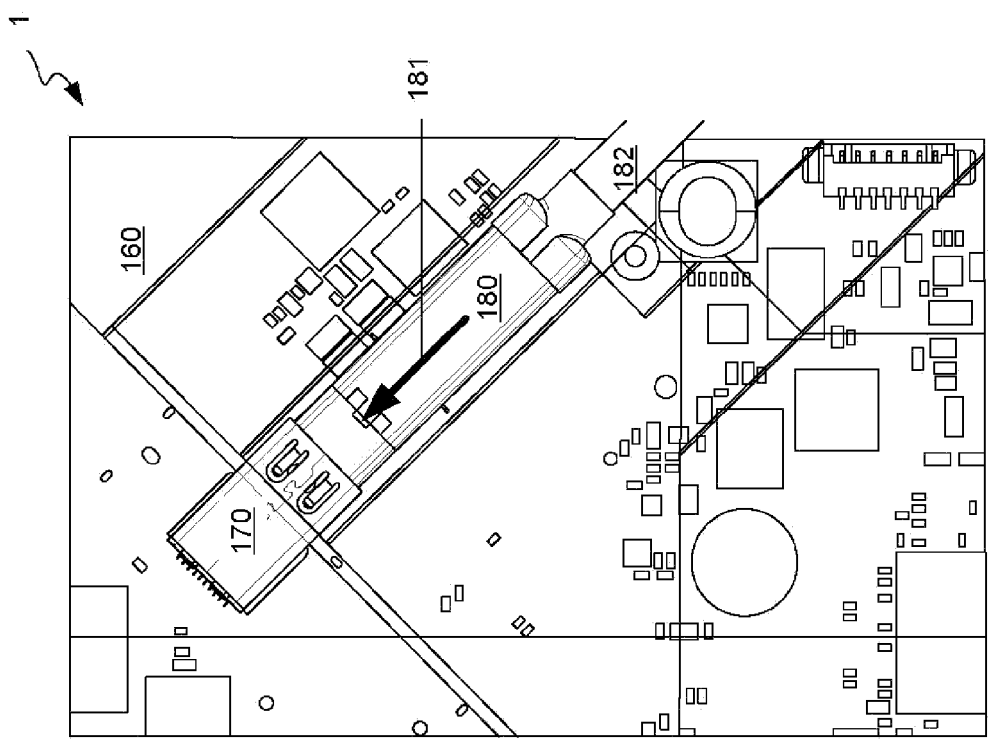
FIG. 2A
FIG. 2B

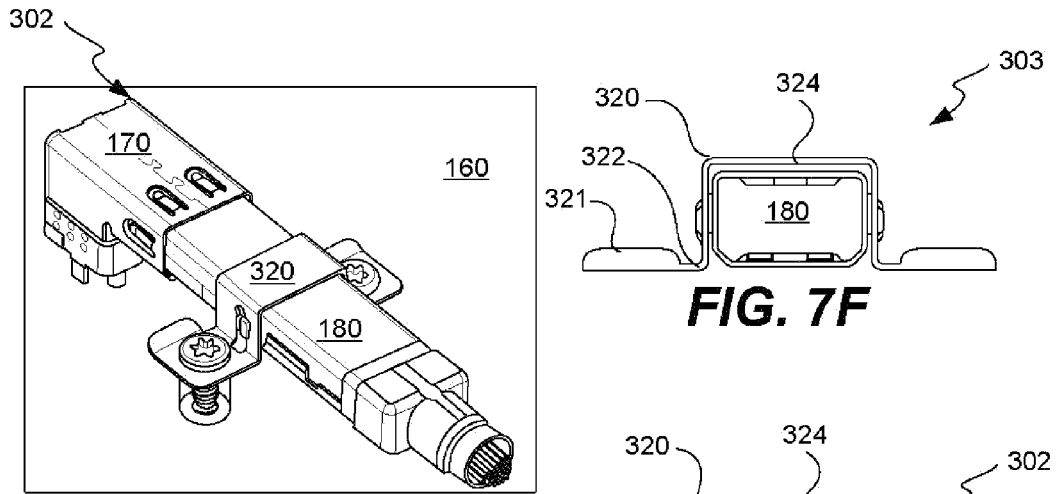
FIG. 7E
FIG. 7F
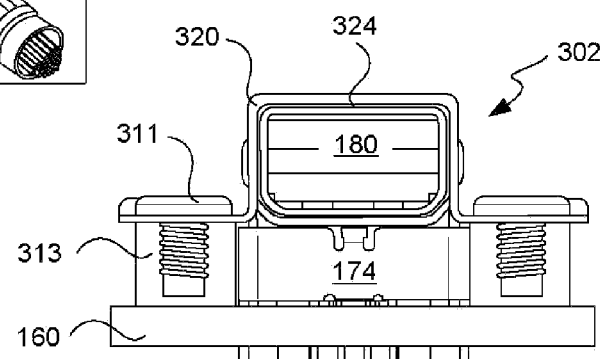
FIG. 7G
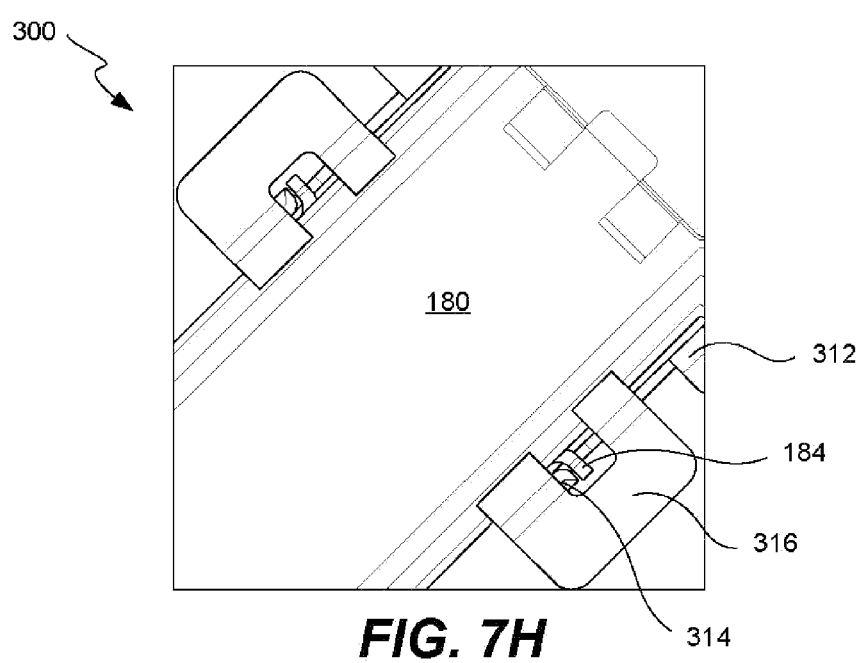
FIG. 7H

INTERNAL CONNECTION RETENTION COMPONENTS FOR COMPUTING DEVICES

TECHNICAL FIELD

The present invention relates generally to computing devices, and more particularly to systems and methods for securely coupling components within personal computing devices.

BACKGROUND

Computing devices are often constructed using peripherals and other components made from a variety of different vendors and manufacturers. For example, a typical personal computing device can include a display device made by one vendor, speakers made by another vendor, a hard drive made by yet another vendor, and a disc drive made by still another vendor, all assembled by a separate primary manufacturer into a single device having processors, storage units, drivers, and other components made by other different vendors or entities. The need to have these different devices all communicate with each other, or at least with a primary processing system, can often result in the use of standardized connections having different ports, cables, connectors and the like.

Where certain peripherals are fairly permanent and internalized within a single computing device, it is often more convenient and cheaper for the connections between peripherals and other device components to use some amount of permanent attachment or hard wiring to a printed circuit board or other similar item. Of course, such designs then tend to result in a particular peripheral or component becoming a permanent part of that computing device, since item modularity and the ability to swap out components can be hindered in such instances. This can be a problem when consumer demands and concerns tend toward modularity for a certain component, such as where the ability to replace, upgrade, remove for repair, or otherwise disassociate a particular peripheral with the overall computing device is desirable.

One well known alternative to hard-wired or other permanent types of connections is to provide standardized plug and port connections involving cables. This type of arrangement can be useful for connections that are intended to allow for external devices to communicate with device components or the overall computing device. Where communications take place entirely within the device, however, it can still be advantageous to allow for readily removable plug and port type connections. For example, a primary display device may receive communications from a CPU, video processor or other device component. Even where the connection between the display device and the other device component is fully within the overall computing device, it may still be desirable to provide a fully internalized standardized plug and ported connection between the components, so as to preserve display modularity.

Unfortunately, the use of fully internalized plug and port connections between device components can give rise to undesirable consequences. Such internal standardized ported and cabled connections are much more susceptible to unintended disconnections or unmatings, such as when devices are jostled, dropped and otherwise ordinarily disturbed repeatedly over long term use. This can be problematic in requiring one to open the device simply to plug the connector back into the port.

While many designs and techniques used to provide internal connections within computing devices have generally worked well in the past, there is always a desire to provide improvements in such designs and techniques. Therefore, the ability to have reliable internal cabled plug and port connections within a computing device that are not susceptible to unintended disconnections is desired.

SUMMARY

It is an advantage of the present invention to provide fully internalized and reliable cabled plug and port connections within a computing device, where such ported connections are not susceptible to unintended disconnections. This can be accomplished at least in part through the use of one or more connection retention components, with such components being adapted to restrict movement of the subject cable, connector plug or both.

In various embodiments, a computing device can include an outer housing adapted to contain a plurality of device components entirely therein, which internal components can include a processor, a peripheral device, a cable coupling the processor to the peripheral device, and a connection retention component. The peripheral device can have a communication port utilizing a standardized connection interface, and the cable can include a communication connector plug that removably connects with the communication port and also uses the same standardized connection interface. The connection retention component can be coupled to at least one of the communication port, the communication connector plug, and the cable, such that the connection retention component restricts the inadvertent disconnection of the communication connector plug and the communication port from each other.

In various detailed embodiments, the communication plug and port can be a Mini DisplayPort connector plug and a Mini DisplayPort. Also, the communication port can be mounted to a printed circuit board that is located entirely within the computing device. In some embodiments, the connection retention component contacts and holds the cable in place to restrict movement thereof at a location substantially near the second standardized connection. In some embodiments, the connection retention component contacts and holds the communication connector plug itself in place. In some embodiments, the connection retention component can be a clip, a clamp, or both.

In various detailed embodiments where the connection retention component includes a clamp, the clamp can be a retention clamp that operates to restrict any movement of the communication connector plug with respect to the communication port, such as movement in each of the axial, horizontal and vertical directions. In addition, both the communication port and at least a portion of the clamp can be both mounted to a printed circuit board that is located entirely within the computing device. Also, the clamp can include a plurality of components that are fastened together to collectively contact and hold both the communication connector plug and the communication port. Such clamp components can include a bottom bracket mounted to the printed circuit board, wherein the bottom bracket receives both of the communication connector plug and the communication port into specific locations therein, and a top bracket mounted over the top of the bottom bracket and the communication port. The bottom bracket can include a tongue portion having a leading edge that contacts flush against a chin portion of the communication port, and the tongue portion can restrict undesired rotation of the bottom bracket when the bottom bracket is mounted to the printed circuit board. Further, the retention clamp can surround and contact the communication connector plug on the top, bottom and two elongated sides of the communication connector plug.

In still further embodiments, various methods of securing a ported connection between a cabled communication connector plug inserted into a communication port can include the steps of physically securing the communication port to a reference component, forming one or more mounting features on the reference component, plugging the cabled communication connector plug into the communication port to form a connection therebetween, and coupling a connection retention component to the mounting features and at least one of the communication port, the communication connector plug, and the cable. Again, under such an arrangement the connection retention component can restrict the inadvertent disconnection of the communication connector plug and the communication port from each other. Also, the communication connector plug, communication port and/or other components can all be entirely within an associated electronic device. Further, the reference component can be a printed circuit board.

In various detailed embodiments, the connection retention component can be a multiple part retention clamp located entirely within the outer housing and coupled to each of the communication port, the communication connector plug and the printed circuit board. The retention clamp can include a plurality of components that are fastened together to collectively restrict any movement of the communication connector plug in each of the axial, horizontal and vertical directions. In addition, the coupling step can further include the steps of: locating a bottom bracket in place with respect to both of the reference component and the communication port, mounting the bottom bracket with respect to the mounting features on the printed circuit board, locating a top bracket in place over both of the bottom bracket and the communication connector plug, and coupling the top bracket to the bottom bracket.

Other apparatuses, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and arrangements for the disclosed inventive internal connection retention component for computing devices. These drawings in no way limit any changes in form and detail that may be made to the invention by one skilled in the art without departing from the spirit and scope of the invention.

FIG. 2A illustrates in top plan view an exemplary cabled communication connector plug inserted into a communication port on a printed circuit board according to one embodiment of the present invention.

FIG. 2B illustrates in top plan view an exemplary connection retention component restricting the inadvertent disconnection of the communication connector plug from the communication port of FIG. 2A according to one embodiment of the present invention.

FIG. 7E illustrates in front perspective view from a different angle the ported connection of FIG. 7A having an alternative connector plug clip according to an alternative embodiment of the present invention.

FIG. 7F illustrates in front cross-sectional view the ported connection and connector plug clip of FIG. 7E according to one embodiment of the present invention.

FIG. 7G illustrates in front cross-sectional view the ported connection and connector plug clip of FIG. 7E as being mounted to standoffs atop the printed circuit board according to one embodiment of the present invention.

FIG. 7H illustrates in bottom plan view the ported connection and connector plug clip of FIG. 7A according to one embodiment of the present invention.

DETAILED DESCRIPTION

Exemplary applications of apparatuses and methods according to the present invention are described in this section. These examples are being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following examples should not be taken as limiting.

In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting; such that other embodiments may be used, and changes may be made without departing from the spirit and scope of the invention.

The invention relates in various embodiments to a personal computing device, such as any of the various desktop, laptop or tablet computers manufactured by Apple Inc. of Cupertino, Calif. Although the various embodiments set forth in detail herein are described with respect to a tablet device, it will be readily appreciated that the present invention can also apply to other forms of computing devices having plug and port connections. For example, cellular telephones and large servers and components, among other computing and electronic devices, can also utilize the various ported connections, retention components and other details of the present invention. Furthermore, although the various embodiments set forth in detail herein are described with respect to a Thunderbolt™ or other Mini DisplayPort type of ported connection, it will be readily appreciated that the present invention can also apply to other forms and types of plug and port connections.

Computing Devices

Figure 1A:
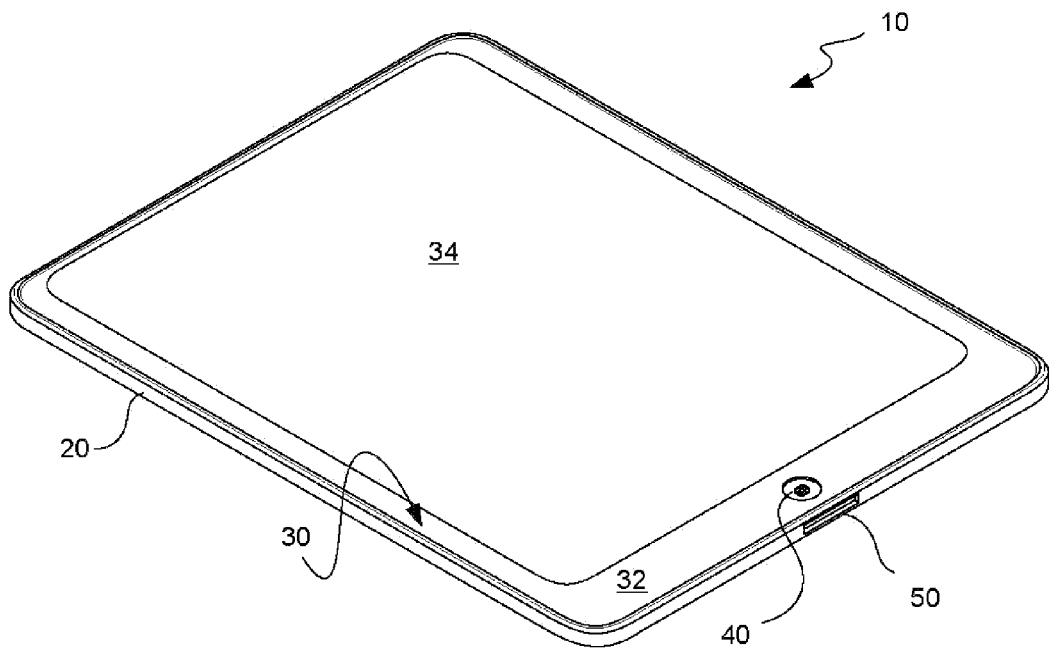
FIG. 1A illustrates in top perspective view an exemplary personal computing device.

One example of a personal computing device in the form of a tablet computer is shown in side elevation view in FIG. 1A. As shown, tablet computer 10 can generally include an outer housing 20, and a cover glass 30 having a masked frame region 32 and a relatively large display region 34. Various internal components (not shown) can be included within an inner cavity created by the outer housing 20 and cover glass 30 combination, which can include an internal display device, one or more processors, storage components, circuit boards, power supplies, and the like. A home button 40 and input/output port 50 can also be included on tablet computer 10, as well as various other components and features, as will be readily appreciated.

Figure 1B:
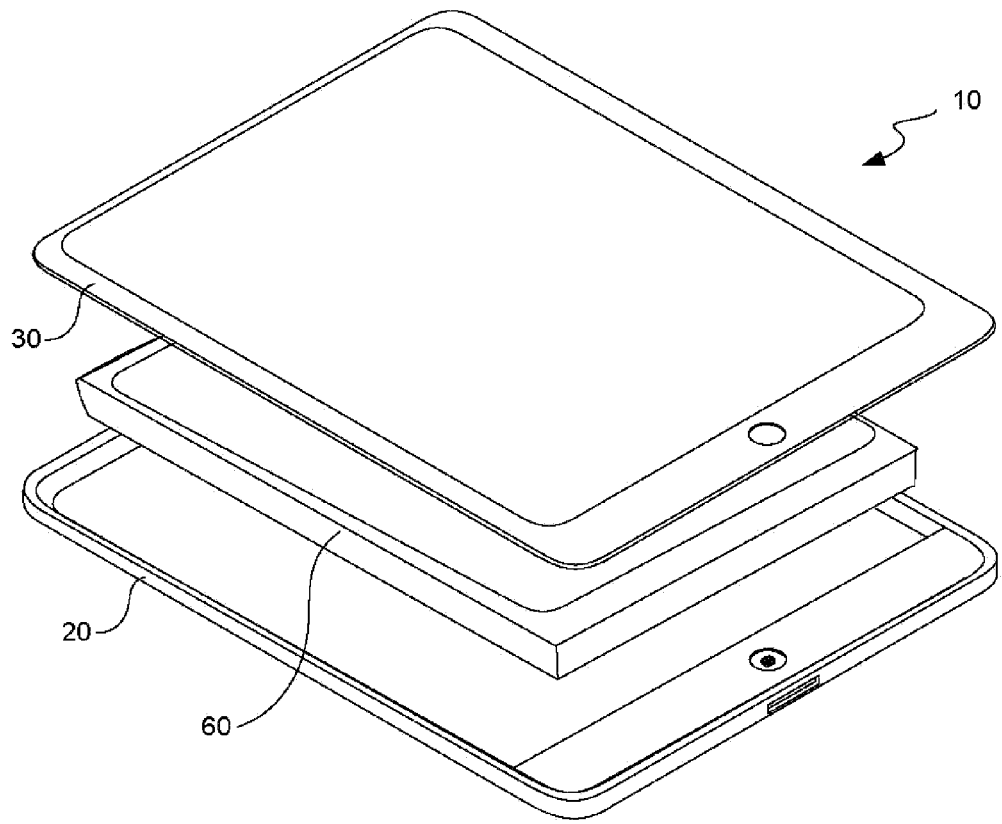
FIG. 1B illustrates in partially exploded perspective view the personal computing device of FIG. 1A.

Continuing with FIG. 1B, the personal computing device of FIG. 1A is shown in partially exploded perspective view. Tablet computer 10 can generally include an outer housing 20 and cover glass 30, as well as one or more major components 60 that are housed between the outer housing and cover glass. Such major components 60 can include, for example, a display device, one or more disk drives, fans, processors and the like. Such major components 60 can also include a primary printed circuit board, which can include a variety of processors, storage components, connections, and ports formed thereon, as will be readily appreciated.

Figure 1C:
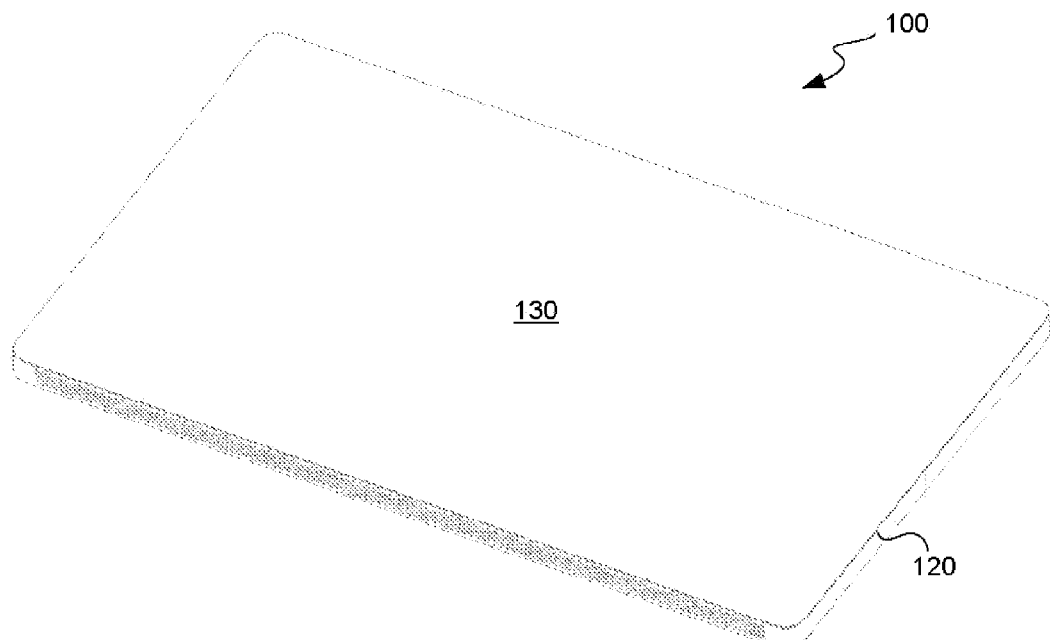
FIG. 1C illustrates in top perspective view an alternative exemplary personal computing device.

An alternative example of a personal computing device in the form of a cinema display for a desktop computer is shown in top perspective view in FIG. 1C. As shown, cinema display 100 can generally include an outer housing 120, and a cover glass 130. Various internal components (not shown) can be included within an inner cavity created by the outer housing 120 and cover glass 130 combination, which can include an internal display device, one or more processors, storage components, circuit boards, power supplies, and the like.

Figure 1D:
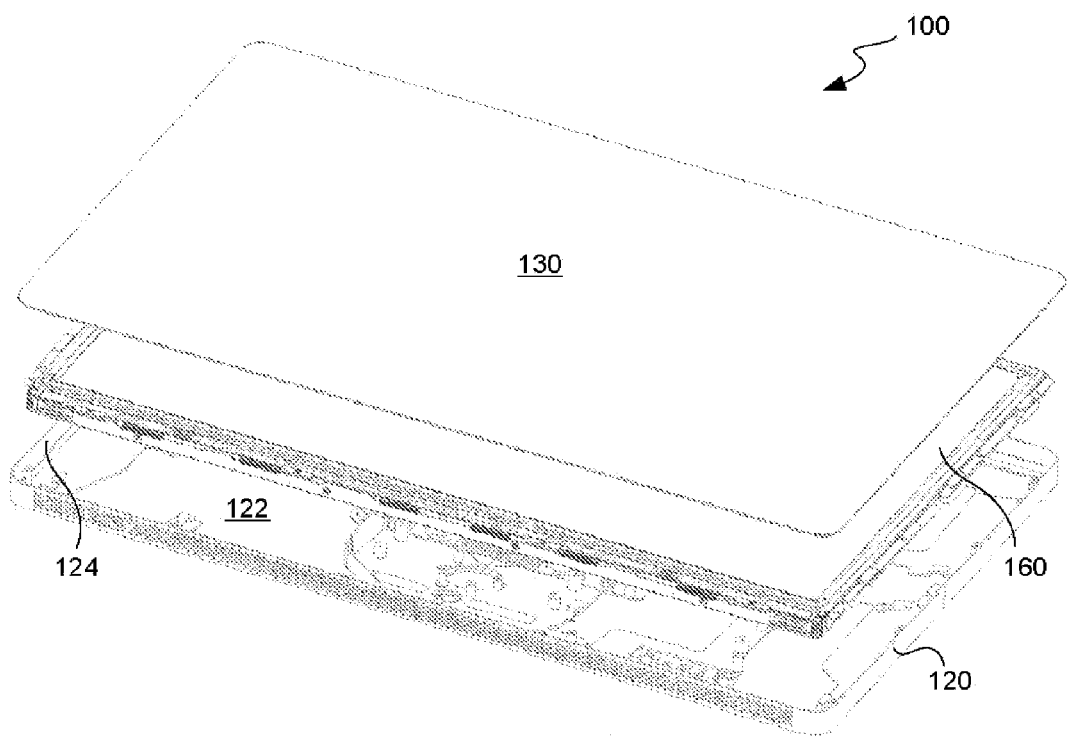
FIG. 1D illustrates in partially exploded perspective view the alternative personal computing device of FIG. 1C.

Continuing with FIG. 1D, the personal computing device of FIG. 1C is shown in partially exploded perspective view. Cinema display 100 can generally include an outer housing 120 and cover glass 130, as well as one or more major components 160 that are housed between the outer housing and cover glass. Again, such major components 160 can include, for example, a display device, one or more disk drives, fans and processors, as well as a primary printed circuit board, which can include a variety of processors, storage components, connections, and ports formed thereon, as will be readily appreciated.

Turning next to FIG. 2A, an exemplary cabled communication connector plug inserted into a communication port on a printed circuit board is shown in top plan view. Arrangement 1 includes a printed circuit board 160, communication port 170, and communication connector plug 180 with attached cable 182. Printed circuit board 160 can be, for example, a major component contained entirely within the housing of a personal computing device, such as in the case of component 60 within device 10 above. Printed circuit board 160 can be the primary circuit board of its respective computing device, or can be a smaller secondary circuit board, such as for a video display or other peripheral device or component. A communication port 170 can be built into, mounted to or otherwise coupled to printed circuit board 160, and this communication port can be a standardized port adapted to accept a suitable standardized communication plug. As shown, cabled communication connector plug 180 is inserted into port 170 in direction 181, and cable 182 is coupled to the connector plug. Both of communication port 170 and communication connector plug 180 can be contained entirely within the housing of the overall computing device. In one particular exemplary embodiment, communication port 170 can be a Mini DisplayPort, and communication connector plug 180 can be a Thunderbolt™ plug adapted for use with a Mini DisplayPort, although other types and forms of standardized ports and plugs can also be used.

Connection Retention Components

Continuing with FIG. 2B, the cabled communication connector plug from the communication port of FIG. 2A is similarly shown in top plan view, only as now having an exemplary connection retention component restricting its inadvertent disconnection from the communication port. As shown, arrangement 100 includes the same printed circuit board 160, communication port 170, communication connector plug 180 and coupled cable 182 as all being in substantially the same position. Only now, the cable 182 is held in place by a connection retention component 110. This particular connection retention component 110 can comprise a cable clip that contacts and holds the cable 182 in place using and with respect to the printed circuit board 160 to restrict movement thereof. The cable clip 110 can be located at or substantially near the communication connector plug 180. Movement is restricted due to the cable clip 110 and communication port 170 both being secured to the same reference component, in this case the printed circuit board 160. It will be readily appreciated that other reference components can be used for this purpose, such as where a printed circuit board is not present or convenient to use in a given application. Cable clip 110 can be formed of metal, hard plastic or any other suitable material. Other forms of connection retention components can include connector plug clips or clamps, as set forth in greater detail below.

The various advantages for such connection retention components are numerous. In particular, these connection retention components serve to prevent or restrict the inadvertent disconnection of the communication plug from the communication port. This is especially useful where the plug and port are contained entirely within the overall device and are thus not readily accessible for a user to correct any inadvertent disconnection. The use of these connection retention components also allows the device manufacturer to more readily use peripheral components and other items having standardized plug and port communication interfaces that are made by vendors or third parties. Keeping the more readily modular nature of peripherals and other items having such plug and port interfaces is also a benefit, particularly where the respective connection retention components can be readily removed themselves when the device interior is eventually accessed. As still another benefit, some connection retention components can serve to stabilize the cable and/or plug, so as to prevent any wobble or other slight movements that can result in the inadvertent mismatching or disconnection of individual contacts within the connection interface while the plug still remains engaged. Preventing or limiting wobble and other movement can also lengthen the life span of the cable and plug.

Figure 3A:
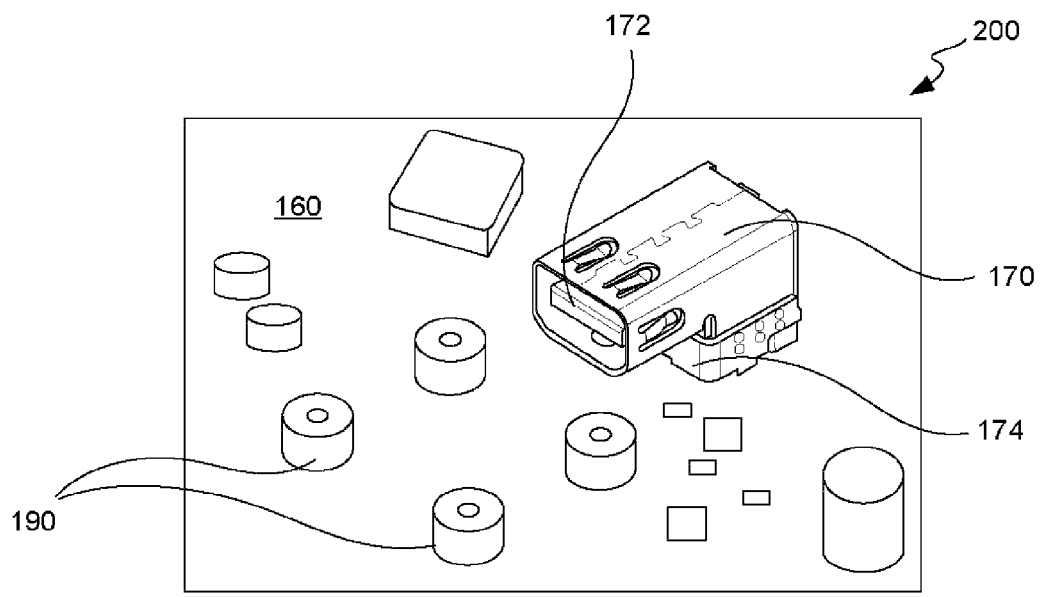
FIG. 3A illustrates in side perspective view an exemplary communication port on a printed circuit board similar to that of FIG. 2A according to one embodiment of the present invention.

FIG. 3A illustrates in side perspective view an exemplary communication port on a printed circuit board similar to that of FIG. 2A according to one embodiment of the present invention. Arrangement 200 similarly includes printed circuit board 160 and communication port 170, which can include a standardized porting interface 172 and an elevated chin region 174. In addition, a plurality of mounting standoffs 190 can be mounted or otherwise firmly coupled to printed circuit board 160. Although four standoffs 190 are shown, it will be understood that more or fewer standoff could alternatively be used.

Figure 3B:
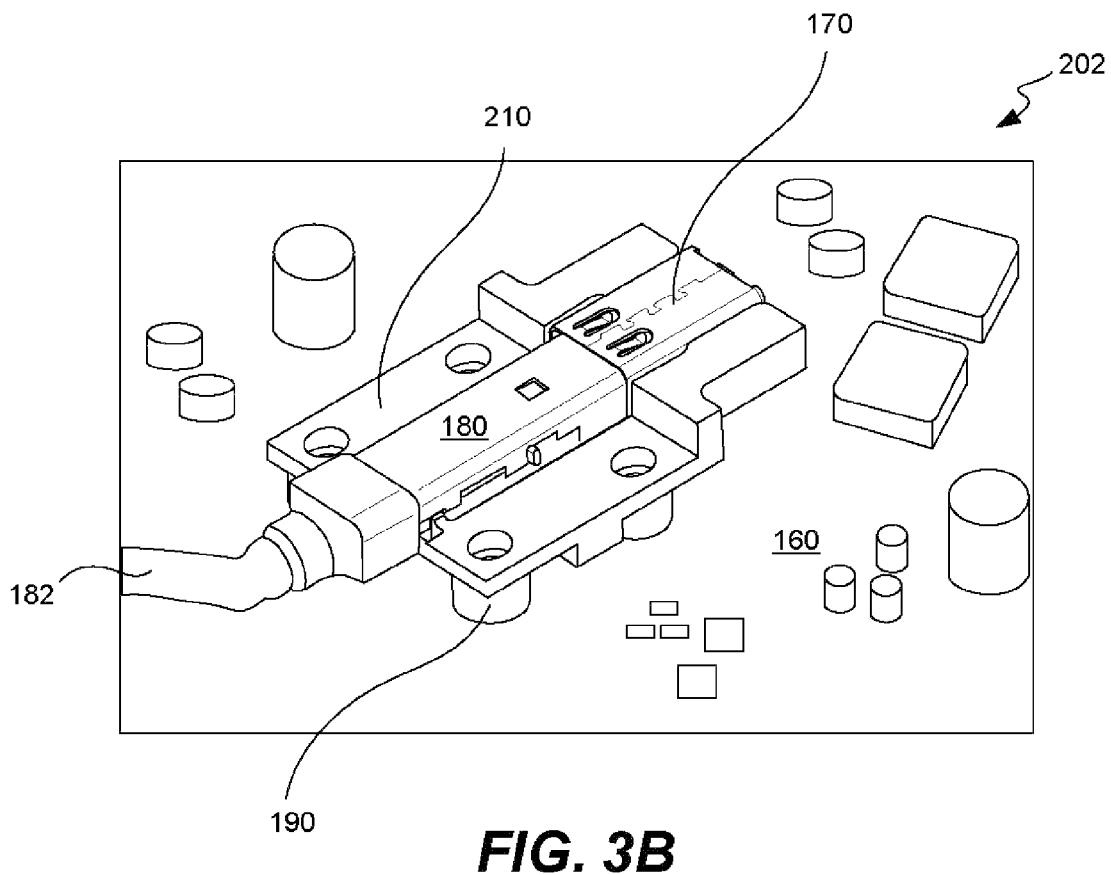
FIG. 3B illustrates in top perspective view the communication port of FIG. 3A with a cabled communication connector plug inserted therein and a portion of an exemplary connection retention component in the form of a clamp coupled to both the communication port and plug according to one embodiment of the present invention.

FIG. 3B depicts the communication port of FIG. 3A with a cabled communication connector plug inserted therein and a portion of an exemplary connection retention component in the form of a clamp coupled to both the communication port and plug. Arrangement 202 again includes printed circuit board 160, communication port 170, and a plurality of mounting standoffs 190. In addition, communication connector plug 180 is inserted into port 170, and cable 182 is coupled to the connector plug. One portion of an overall customized clamp in the form of bottom bracket 210 is situated around and between the port, plug and standoffs. Further details regarding this clamp and the full assembly thereof are provided below.

Clips

Turning now to FIGS. 4A through 6D, various different examples of connection retention components in the form of cable clips and clamps are provided. It will be understood that such examples are illustrative in nature, and that many other variations of cable clips and clamps can also be used. In particular, all of the various cable clips and clamps are designed and intended to restrict the inadvertent disconnection of an associated communication connector plug and communication port from each other, restrict movement of an associated cable, or both.

Figure 4A:
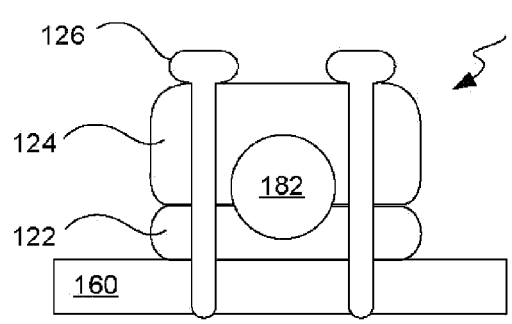
FIG. 4A illustrates in front cross-sectional view a cable and an exemplary connection retention component in the form of a cable holding clamp according to one embodiment of the present invention.

FIG. 4A illustrates in front cross-sectional view an exemplary cable holding clamp, which is just one of many different suitable cable clamp designs. Clamp 120 is designed to hold cable 182 in place with respect to an associated reference component, such as a printed circuit board 160. Clamp 120 includes a bottom portion 122 and top portion 124 that are separate and mate together to form a combined opening therethrough to accommodate cable 182. One or more screws, nails or other suitable fasteners 126 can protrude through top portion 124, bottom portion 122 and circuit board 160 to hold the cable 182 in place. Such fasteners 126 and their installation can be designed to be readily removable if so desired, such that cable 182 can be released when desired during disassembly, but is firmly held in place otherwise.

Figure 4B:
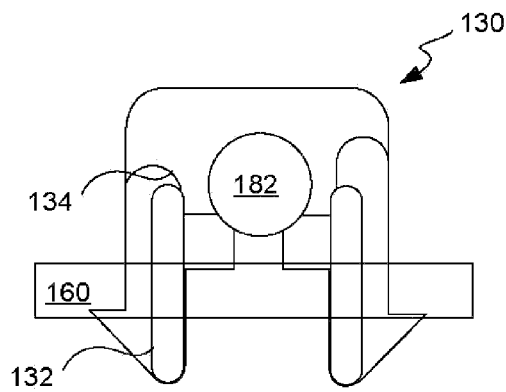
FIG. 4B illustrates in front cross-sectional view a cable and an exemplary connection retention component in the form of a cable holding clip according to an alternative embodiment of the present invention.

FIG. 4B depicts in front cross-sectional view a cable holding clip, which is just one of many different suitable cable clip designs. Clip 130 can include an upper portion 134 and one or more lower hooks or tabs 132 that are integrated together into a single component. Upper portion 134 can include an opening therethrough to accommodate cable 182, while tabs 132 extend through openings in the printed circuit board 160 to hold the clip in place. Preferably, the tabs 132 can be pinched together or otherwise moved somewhat to enable the tabs to then move through the openings in the circuit board 160 such that the whole clip 130 can be removed, as will be readily appreciated by one skilled in the art.

Figure 5A:
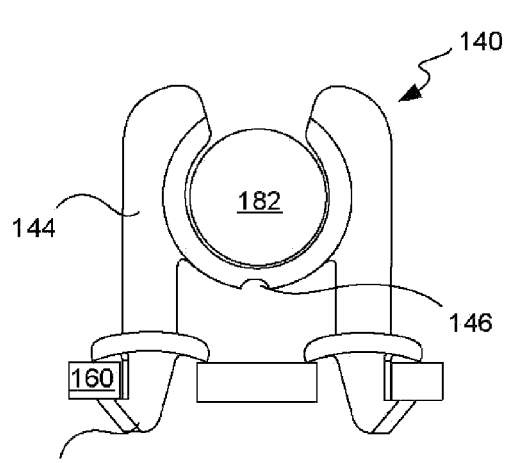
FIG. 5A illustrates in front cross-sectional view a cable and an exemplary connection retention component in the form of a flexible cable holding clip according to yet another alternative embodiment of the present invention.

FIG. 5A shows a flexible cable holding clip in front cross-sectional view. Flexible clip 140 can similarly include an upper portion 144 and one or more lower hooks or tabs 142 that are integrated together into a single component. Upper portion 144 can similarly include an opening therethrough to accommodate cable 182, while tabs 142 similarly extend through openings or other mounting features in the printed circuit board 160 to hold the clip in place. As shown in FIGS. 5A-5D, various flanges can be used at or proximate the tabs and cable accommodating opening, as may be desired. Again, the tabs 142 can preferably be pinched together or otherwise moved somewhat to enable the tabs to then move through the openings in the circuit board 160 such that the whole clip 140 can be removed. A notch 146 or other feature can be used to help facilitate such clip flexing or movement.

Figure 5B:
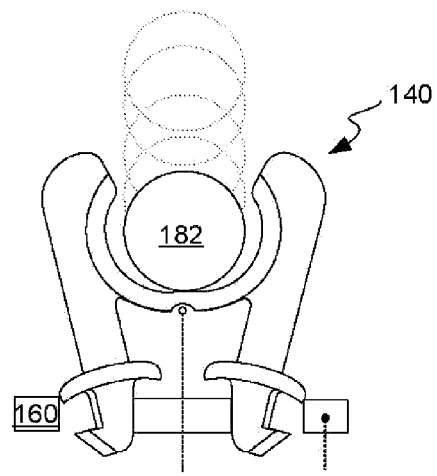
FIG. 5B illustrates in front cross-sectional view a cable and an actuated version of the flexible cable holding clip of FIG. 5A according to one embodiment of the present invention.
Figure 5C:
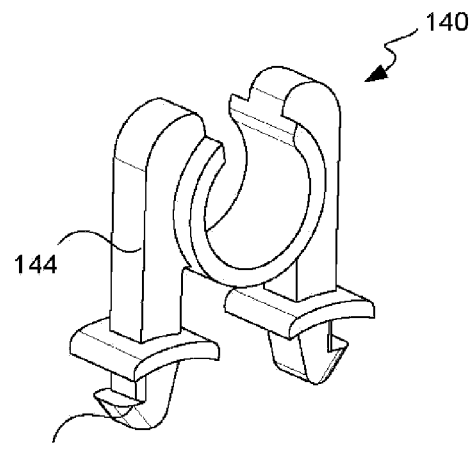
FIG. 5C illustrates in side perspective view the flexible cable holding clip of FIG. 5A according to one embodiment of the present invention.
Figure 5D:
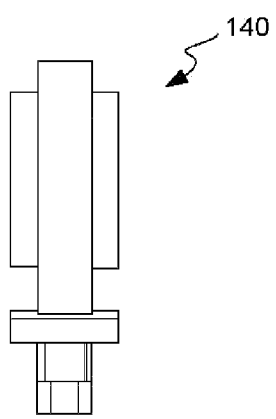
FIG. 5D illustrates in side elevation view the flexible cable holding clip of FIG. 5A according to one embodiment of the present invention.

FIG. 5B depicts in front cross-sectional view an actuated version of the flexible cable holding clip of FIG. 5A. As shown, the tabs have been pinched inward such that they are then able to pass through openings in the circuit board 160. This movement can be facilitated about a flexure point at the notch, which also allows for expansion of the opening in the clip 140 for accommodating the cable 182. The cable can then be readily slipped out of the clip in an upward direction as a result. FIG. 5C illustrates in side perspective view and FIG. 5D illustrates in side elevation view the flexible cable holding clip 140 of FIG. 5A without the associated cable or circuit board. These additional are presented simply for added perspective and appreciation of the clip and its features, such as tabs 142 and upper portion 144. Clip 140 can be formed of any suitable material, such as a flexible metal, plastic, rubber or the like.

Continuing with FIGS. 6A-6D, various views of an alternative version of a flexible cable holding clip are provided. Flexible clip 150 can include one or more lower split tabs 152, an upper portion 154, and a ring or flexure component 156 that are all integrated together into a single clip device. Upper portion 154 can similarly include an opening therethrough to accommodate cable 182, while split tabs 152 similarly extend through openings in the printed circuit board 160 to hold the clip in place. As shown in FIGS. 6A-6D, various flanges can be used at or proximate the split tabs, as may be desired. The design of split tabs 152 can allow these tabs to be pinched individually such that each individual split tab when pinched can then move through its respective opening in the circuit board 160 such that the whole clip 150 can then be removed from the board.

Figure 6A:
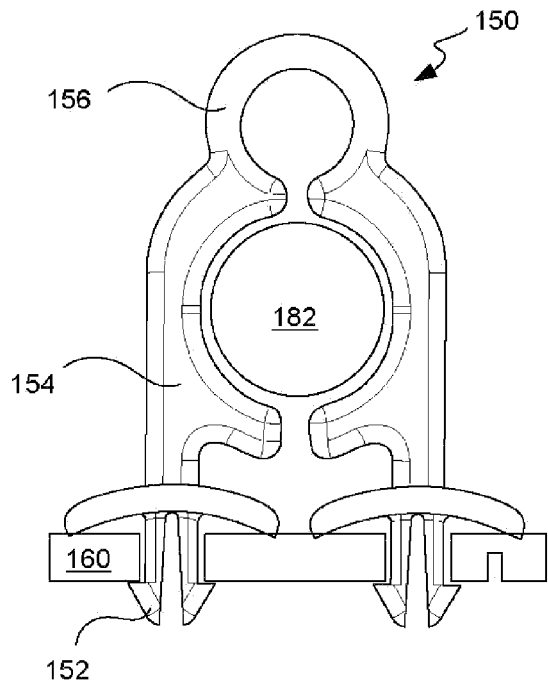
FIG. 6A illustrates in front cross-sectional view a cable and an exemplary connection retention component in the form of a flexible cable holding clip according to still another alternative embodiment of the present invention.
Figure 6C:
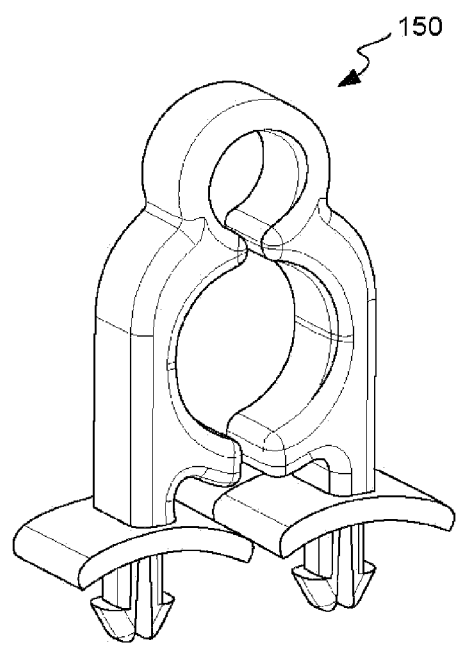
FIG. 6C illustrates in side perspective view the flexible cable holding clip of FIG. 6A according to one embodiment of the present invention.
Figure 6B:
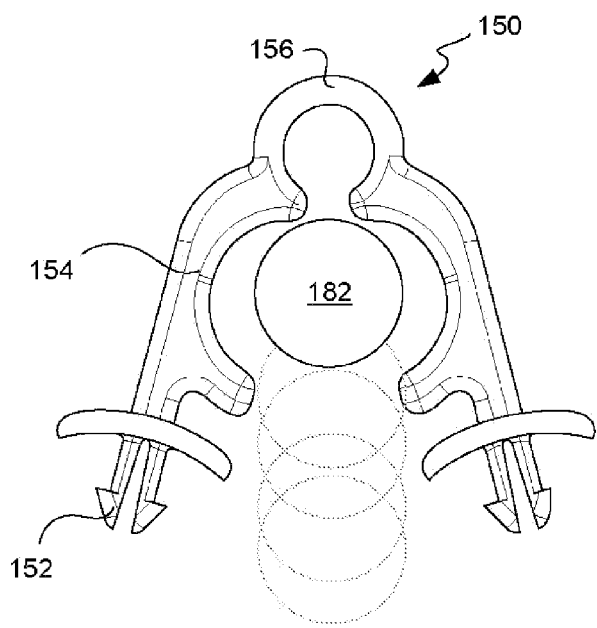
FIG. 6B illustrates in front cross-sectional view a cable and an actuated version of the flexible cable holding clip of FIG. 6A according to one embodiment of the present invention.
Figure 6D:
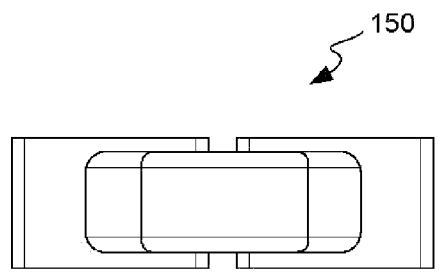
FIG. 6D illustrates in top plan view the flexible cable holding clip of FIG. 6A according to one embodiment of the present invention.

FIG. 6B depicts in front cross-sectional view an actuated version of the flexible cable holding clip of FIG. 6A. As shown, flexible clip 150 has already been removed from the printed circuit board. Flexible clip 150 can then be flexed about upper ring or flexure component 156 to result in expansion of the opening in the clip for accommodating the cable 182. The cable 182 can then be readily slipped out of the clip 150 in a downward direction as a result. FIG. 6C illustrates in side perspective view and FIG. 6D illustrates in top plan view the flexible cable holding clip 150 of FIG. 6A without the associated cable or circuit board. Again, these additional are presented simply for added perspective and appreciation of the clip and its features. Clip 150 can similarly be formed of any suitable material, such as a flexible metal, plastic, rubber or the like.

Moving next to FIGS. 7A-7H, various exemplary connection retention components in the form of connector plug clips are provided. Staring with FIG. 7A, the communication port of FIG. 3A having a cabled communication connector plug inserted therein and a connector plug clip coupled to the connector plug is shown in front perspective view. Arrangement 300 similarly includes a reference component such as printed circuit board 160 and a communication port 170, and can also include a cabled communication connector plug 180 inserted into the communication port and an associated cable 182 coupled to the connector plug. In addition, a connection retention component in the form of a connector plug clip 310 can be installed specifically to hold the connector plug 180 in place with respect to printed circuit board 160 or other reference component. Clip 310 can be specifically designed and adapted to restrict movement of plug 180 in each of the axial, horizontal and vertical directions. Such restriction advantageously not only prevents any unplugging of the plug, but also any inadvertent disconnection, internal shifting or otherwise missed contacts between the contacts of the plug and port connection interfaces.

To this extent, connector plug clip 310 can utilize one or more screws or other connectors 311 that fasten or otherwise couple the clip 310 to the circuit board 160 via one or more lower flanges 312 of the clip. One or more indented recesses 314 can be strategically placed along the sides of the clip 310 to capture and restrict movement of various features that may be located along the sides of plug 180, so as to reinforce the restriction of movement of the clip. In addition, one or more clip extensions 316 can snap fit around the clip 310 to result in better control, positioning and restriction of movement of the plug 180. As shown, flanges 312, indented recesses 314 and extensions 316 can all be formed as part of one unitary and integrated clip 310. One or more additional features or parts may be included to clip to result in better control of plug, as will be appreciated.

Figure 7A:
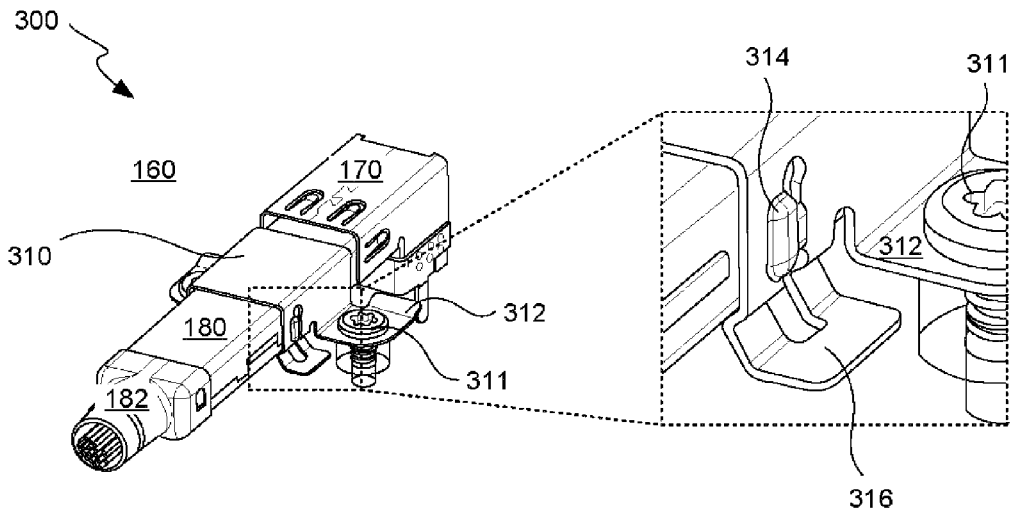
FIG. 7A illustrates in front perspective view the communication port of FIG. 3A with a cabled communication connector plug inserted therein and an exemplary connection retention component in the form of a connector plug clip coupled to the connector plug according to one embodiment of the present invention.
Figure 7B:
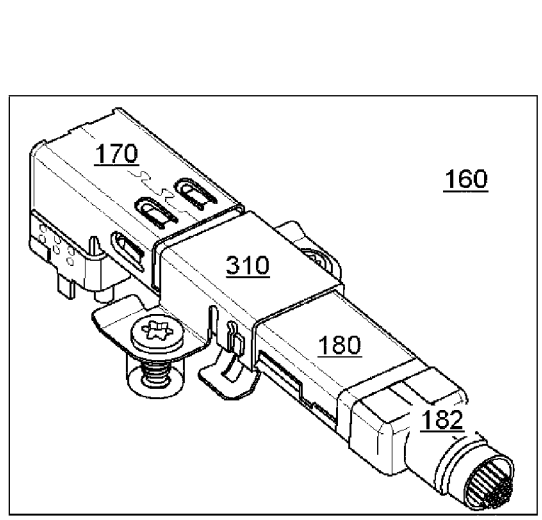
FIG. 7B illustrates in front perspective view from a different angle the ported connection and connector plug clip of FIG. 7A according to one embodiment of the present invention.
Figure 7C:
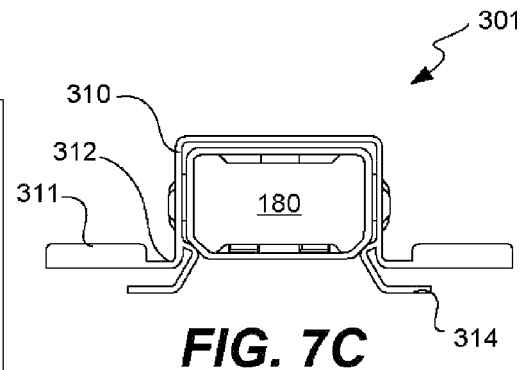
FIG. 7C illustrates in front cross-sectional view the ported connection and connector plug clip of FIG. 7A according to one embodiment of the present invention.
Figure 7D:
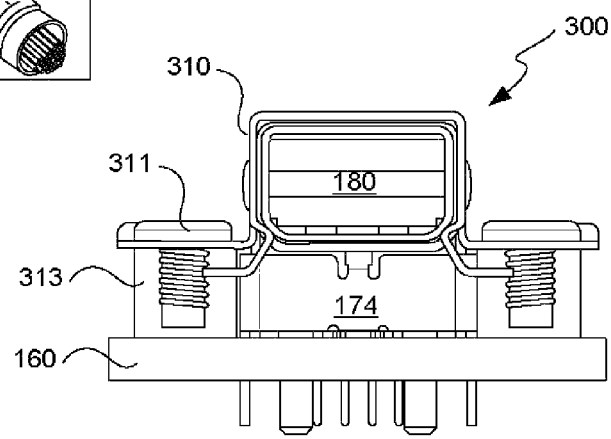
FIG. 7D illustrates in front cross-sectional view the ported connection and connector plug clip of FIG. 7A as being mounted to standoffs atop the printed circuit board according to one embodiment of the present invention.

FIG. 7B illustrates in front perspective view from a different angle, while FIGS. 7C and 7D illustrates in front cross-sectional view different versions of the ported connection and connector plug clip of FIG. 7A. While arrangement 300 of FIG. 7D depicts the exact arrangement using standoffs shown in FIGS. 7A and 7B, arrangement 301 of FIG. 7C depicts a version where no standoffs are used between the clip flanges and the printed circuit board. As will be readily appreciated with respect to FIG. 7D, one or more physical standoffs 313 can be used to couple clip flanges 312 to printed circuit board 160. Such physical standoffs 313 can be removable spacers, or can alternatively be identical or substantially similar to the mounting standoffs 190 noted above. In any event, standoffs 313 can be specifically dimensioned to account for any elevation off the printed circuit board 160 of the interface for communication port 170, such that the chin 174 of the port is viewable beneath the plug 180. Accordingly, plug 180 is firmly held in place by clip 310 at the appropriate elevation above circuit board 160. FIG. 7C depicts arrangement 301 with no standoffs, such as where there might be little to no elevation of the communication port off the circuit board, whereby flanges 312 are coupled directly to the board.

Moving next to FIGS. 7E-7G a ported connection having an alternative connector plug clip according to an alternative embodiment of the present invention is illustrated in front perspective and front cross-sectional views. Arrangements 302 and 303 can similarly include printed circuit board 160, communication port 170, cabled communication connector plug 180 inserted into the communication port and an associated cable 182 coupled to the connector plug. In addition, alternative connector plug clip 320 can similarly be installed to hold the plug 180 in place with respect to the board 160 or other reference component. Alternative clip 320 can be similarly designed and adapted to restrict movement of plug 180 in each of the axial, horizontal and vertical directions. As in the foregoing embodiments above, arrangement 302 represents the use of standoffs 313 to account for elevation of the communication port and its chin 174 above the board 160, while arrangement 303 represents a direct coupling of the clip 320 to the board.

In addition to having one or more screws or other connectors 321 that fasten or otherwise couple the alternative clip 320 to the circuit board 160 via one or more lower flanges 322 of the clip, one or more spot welds 324 can be used to affix the alternative clip 320 to the outer housing of the plug 180. Such a spot weld 324 can be located, for example, along the top of clip 320 as shown. Alternatively, there can be multiple spot welds, and such one or more spot welds can be located along the top and/or sides of the clip and plug. In lieu of such spot welds, one or more adhesives or other suitable fastening types can be used, as will be readily appreciated. Such spot welds or other fastening types can be particularly helpful in restricting axial movement of the connector plug 180, such as where there might be no feature on the exterior of the connector plug to allow for the use of indented recesses, such as those recesses 314 above for clip 310.

FIG. 7H illustrates in bottom plan view the ported connection and connector plug clip of FIG. 7A according to one embodiment of the present invention. As shown, arrangement 300 can include a connector plug 180 having one or more tabs or other exterior features 184 that protrude from the sides of the plug. Such tabs 184 or features may be present, for example, when the exterior plastic coating around a Thunderbolt™ connector plug is removed. As noted above, flanges 312 can be used to screw or otherwise couple the clip to the circuit board, and extensions 316 can serve to form a snap fit for the clip around the plug. Also one or more indented recesses 314 (shown as partially cutaway) on the clip can form a tight recess or pocket for the tabs 184 of the connector plug, such that the tabs are prevented from moving in an axial direction.

Clamps

Turning now to FIGS. 8A through 11C, various different examples of connection retention components in the form of connector plug clamps are provided. It will be understood that such examples are illustrative in nature, and that many other variations of connector plug clamps can also be used. In particular, all of the various connector plug clamps are designed and intended to restrict the inadvertent disconnection of a communication connector plug and communication port from each other, restrict movement of the connector plug, or both.

Figure 8A:
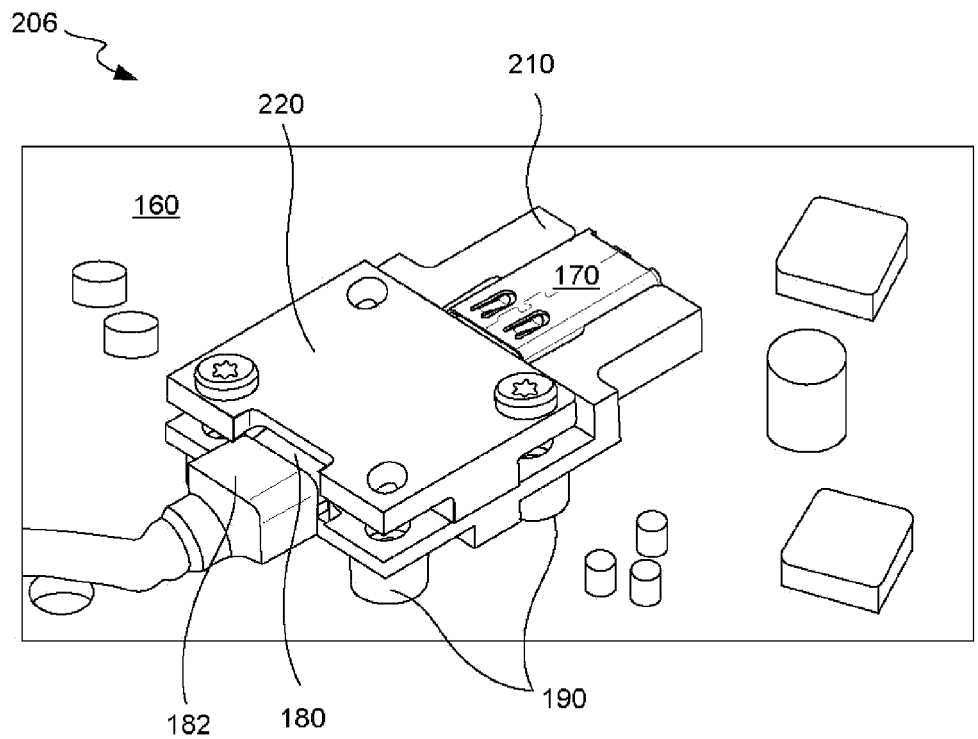
FIG. 8A illustrates in top perspective view the communication port of FIG. 3A with a cabled communication connector plug inserted therein and a completed exemplary connection retention component in the form of a clamp coupled to both the communication port and plug according to one embodiment of the present invention.
Figure 8B:
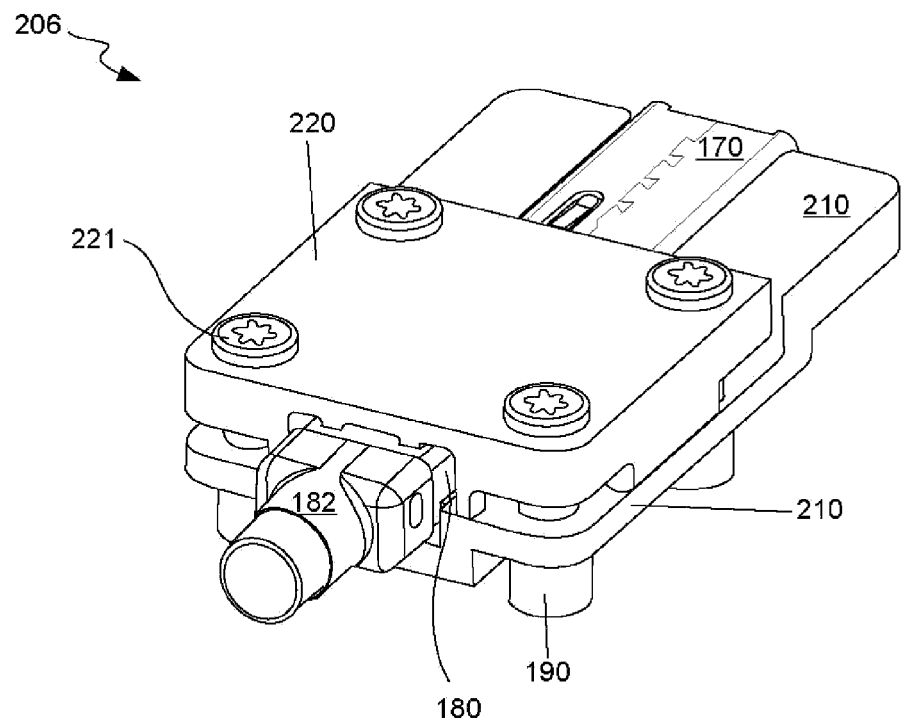
FIG. 8B illustrates in front perspective and partially cutaway view the ported connection and completed clamp of FIG. 8A according to one embodiment of the present invention.

FIG. 8A illustrates in top perspective view and FIG. 8B illustrates in front perspective and partially cutaway view an exemplary completed multiple part connector plug clamp, which is just one of many different suitable clamp designs. Arrangement 206 represents a completed clamp assembled around an associated plug and port, and similarly includes a printed circuit board or other reference component 160, to which a communication port 170 is mounted or otherwise coupled. Again, a communication connector plug 180 is inserted into the port 170, and an associated cable 182 is coupled to the plug. Also, one or more standoffs 190 can be used to help couple the clamp to the circuit board. The multiple part clamp can include a bottom bracket 210 and top bracket 220, which are assembled together and to the board 160 and standoffs 190 with screws 221 or other suitable fasteners, such that the plug 180 is firmly held in place and prevented from disconnecting or moving.

Figure 9A:
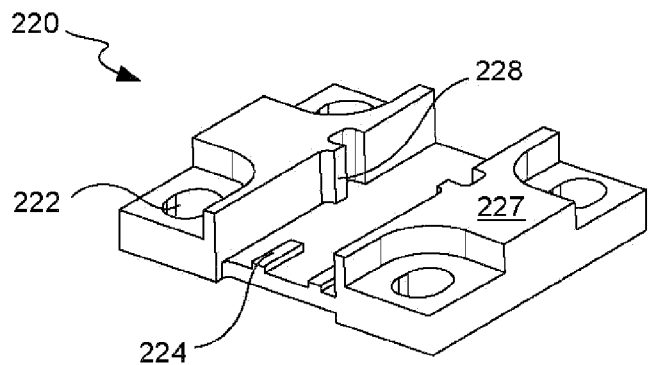
FIG. 9A illustrates in front perspective view an inverted exemplary top bracket of the clamp of FIG. 8A according to one embodiment of the present invention.

Continuing with FIG. 9A, an inverted exemplary top bracket of the clamp of FIG. 8A is illustrated in front perspective view. Top bracket 220 can include one or more openings 222 to accommodate screws or other fastening components, such that the top bracket can help to form a firm clamp on the associated connector plug. One or more contact portions 227 can be specifically dimensioned in height according to the associated plug dimensions, such that the top bracket contacts the associated bottom bracket in forming a firm clamp around the plug. One or more datums 224, 228 along the inner top and side surfaces can be specifically dimensioned such that these datum surfaces serve to contact, align, and clamp the connector plug itself upon installation of all components, as will be readily appreciated.

Figure 9B:
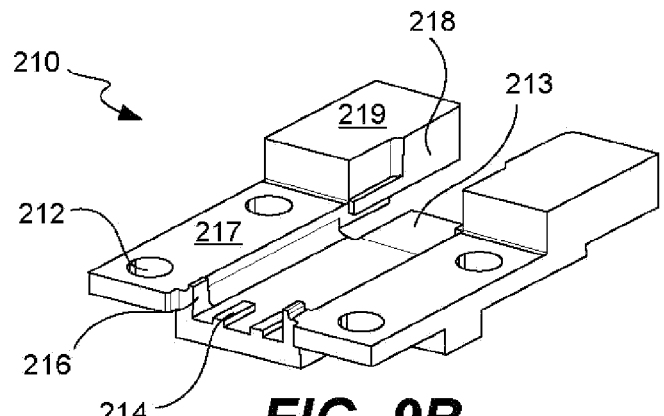
FIG. 9B illustrates in front perspective view an upright exemplary bottom bracket of the clamp of FIG. 8A according to one embodiment of the present invention.

FIG. 9B also illustrates in front perspective view an upright exemplary bottom bracket of the clamp of FIG. 8A. Again, bottom bracket 210 is adapted to work with top bracket 220 above to clamp and hold in place an associated connector plug. Bottom bracket 210 can also have one or more openings 212 to accommodate screws or other fastening components, which openings can align with openings on the top bracket, on the circuit board, or both. A tongue portion 213 can extend toward the back of bottom bracket 210 and be specifically designed to interact with a chin portion of the corresponding communication port, so as to enable a more accurate installation and alignment of all components. Similar to the top bracket above, one or more datums 214, 216, 218 along the inner bottom and side surfaces of the bottom bracket to contact, align and clamp the connector plug and communication port in a more accurate manner. In addition, bottom bracket 210 can include a front portion 217 adapted to straddle, contact and align the connector plug, and also a rear portion 219 adapted to straddle, contact and align with the communication port.

Figure 9C:
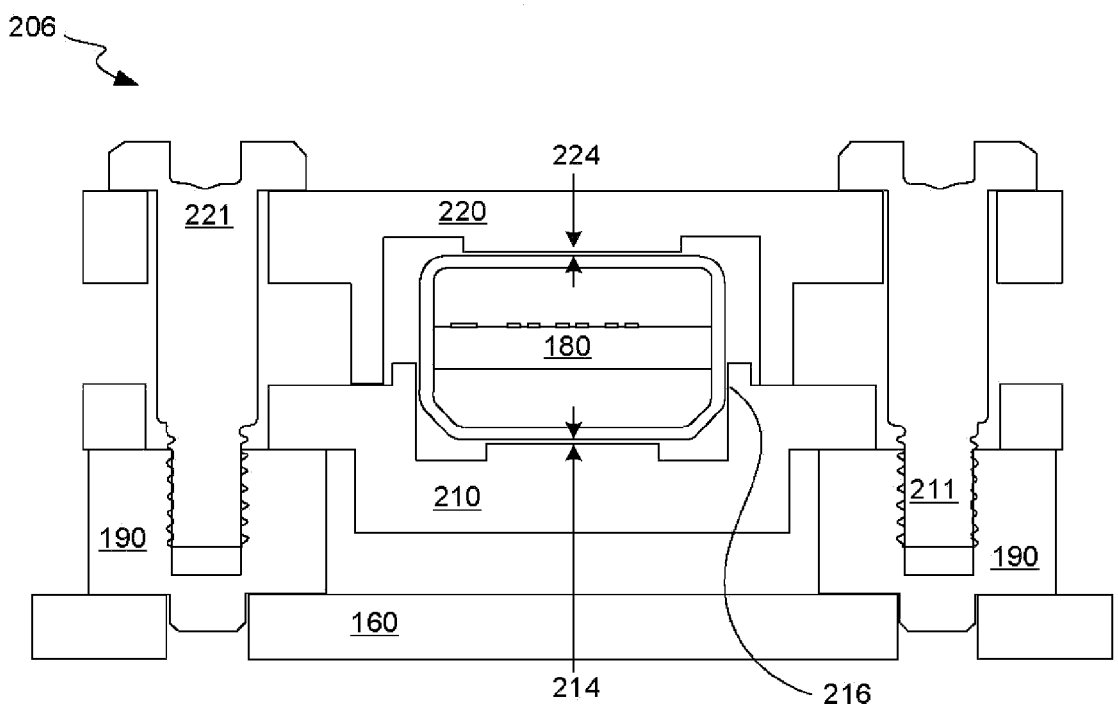
FIG. 9C illustrates in front cross-sectional view the ported connection and completed clamp of FIG. 8A according to one embodiment of the present invention.

FIG. 9C depicts in front cross-sectional view the ported connection and completed clamp of FIG. 8A according to one embodiment of the present invention. Again, arrangement 206 represents a completed clamp assembled around and holding firmly in place a ported plug 180 with respect to a circuit board 160. The clamp includes a bottom bracket 210 and top bracket 220 that are clamped together around the plug 180 and held in place by one or more screws 211, 221 or other fasteners. Although screws 211, 221 are each shown as going through all of circuit board 160, standoff 190, bottom bracket 210 and top bracket 220, it will be readily appreciated that such screws may be limited to fastening fewer that these components at one time, such as in the specific exemplary embodiments shown below in FIGS. 10D-10G.

As noted above, each of bottom bracket 210 and top bracket 220 can include numerous datums or contacts points that serve to contact, align and clamp the connector plug in a more accurate fashion. For example, bottom bracket 210 can include a bottom datum and side datum 216 that contact the bottom and sides of the connector plug 180, while top bracket 220 can include a top datum 224 that contacts the top of the connector plug. Further datums and contact points may be used, and such contacts points and datums may also be used with respect to the communication port as well, as noted above.

Turning next to FIGS. 10A-10G, one particular example of the assembly the connector plug clamp of FIGS. 8A-9C into an overall communication plug to port connection system is provided. It will be readily appreciated that the steps or stages of such an assembly can take place in somewhat different order, and that various details can be deleted, added or substituted for those provided in this illustrative example. Starting with FIG. 10A the exemplary communication port of FIGS. 2A and 3A, for example, and four standoffs on an associated printed circuit board are shown in top perspective view. Again, arrangement 200 can include a printed circuit board 160, communication port 170 and plurality of standoffs 190 mounted or otherwise coupled to the circuit board. At the next stage in FIG. 10B, arrangement 201 depicts bottom bracket 210 as being located in place with respect to the circuit board, standoffs and communication ports. This can involve tilting and sliding the bottom bracket into place, for example.

Figure 10A:
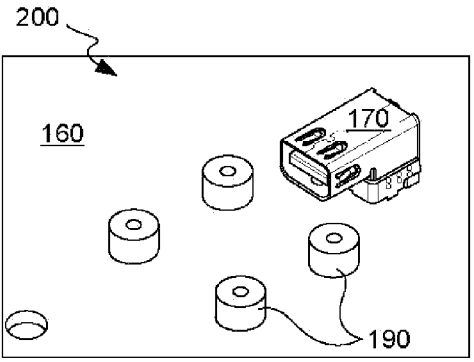
FIG. 10A illustrates in top perspective view the exemplary communication port of FIGS. 2A and 3A and four standoffs on an associated printed circuit board according to one embodiment of the present invention.
Figure 10B:
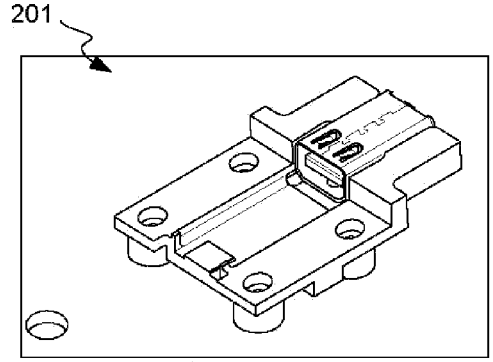
FIG. 10B illustrates in top perspective view the exemplary installation of a bottom bracket of a clamp to the communication port and standoffs of FIG. 10A according to one embodiment of the present invention.
Figure 10C:
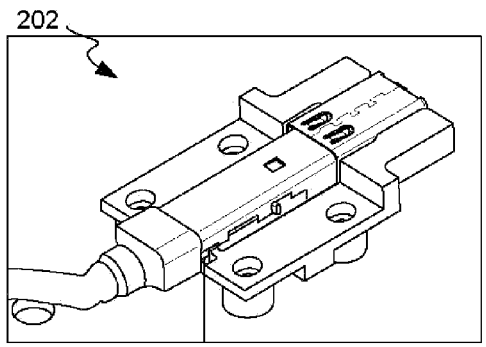
FIG. 10C illustrates in top perspective view the exemplary insertion of a cabled communication connector plug into the communication port and clamp bottom bracket of FIG. 10B according to one embodiment of the present invention.
Figure 10D:
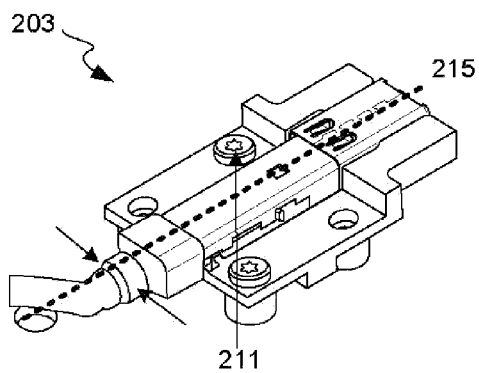
FIG. 10D illustrates in top perspective view the exemplary installation of two screws to fasten the clamp bottom bracket to two of the standoffs in the arrangement of FIG. 10C according to one embodiment of the present invention.

Arrangement 202 is shown again in FIG. 10C, which involves the associated communication connector port 180 as being plugged into communication port 170. One or more screws 211 or other suitable fasteners can then be used to fasten the bottom bracket 210 in place to the standoffs 190, as shown in FIG. 10D. As shown, two screws 211 can be placed in diagonal fashion in the four holes of bottom bracket 210, such that the other two diagonally located holes of the bottom bracket can be reserved for affixing the top bracket thereto. It should be noted that having a proper alignment and installation of the communication connector plug 180 with and to communication port 170 along axis 215 is preferable.

Figure 10E:
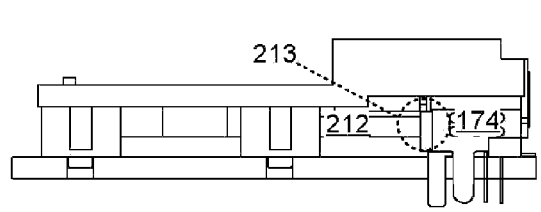
FIG. 10E illustrates in side elevation view the arrangement of FIG. 10D during the screw installation according to one embodiment of the present invention.

To this extent, arrangement 204 in the side elevation view shown in FIG. 10E reflects how the tongue portion 212 of the bottom bracket preferably contacts the chin portion 174 of the communication port in a flush manner 213 during the assembly and fastening of bottom bracket 210 and screws 211. As such, bottom bracket 210 can be firmly pushed forward to result in such a flush contact 213 while the screws 211 are being torqued or other suitable connectors are being fastened. The connector plug can also be held in place while the screws 211 or other suitable connectors are fastened in place.

Figure 10F:
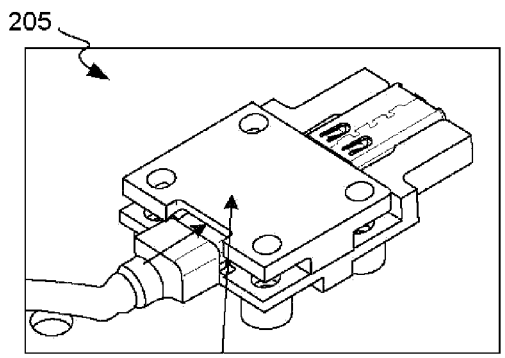
FIG. 10F illustrates in top perspective view the exemplary installation of a top bracket of a clamp to the arrangement of FIG. 10D according to one embodiment of the present invention.
Figure 10G:
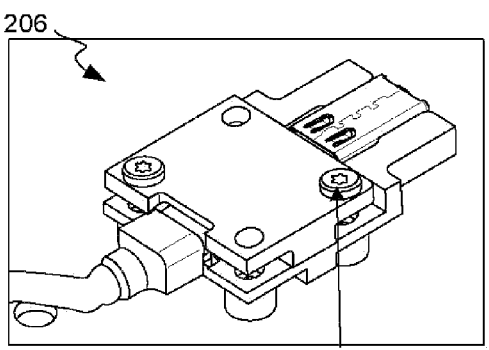
FIG. 10G illustrates in top perspective view the exemplary installation of two additional screws to fasten the clamp top bracket to the clamp bottom bracket in the arrangement of FIG. 10F according to one embodiment of the present invention.

The next arrangement 205 in the process is provided back in top perspective view again in FIG. 10F. Here, top bracket 220 can be dropped straight down atop the connection plug 180 and bottom bracket 210. Top bracket 220 can then be pushed toward the connection port 170, which can ensure that the plug is fully seated within the port when the appropriate datums are located on the top bracket 220 for such an interaction, as will be readily appreciated. FIG. 10G then depicts the installation of two additional screws 221 or suitable fasteners along the other two diagonal openings to fasten the clamp top bracket to the clamp bottom bracket. Again, such an installation of screws 221 can involve pushing the entire bracket combination toward the communication port, such that the flush interaction 213 of bracket tongue 212 to port chin 174 is firmly observed during screw torquing. As will be readily appreciated, any or all of the four screws 211, 221 can be loosely installed in place before pushing and torquing the screws firmly, such that a more accurate alignments of all parts results in the finally assembled product.

Figure 11A:
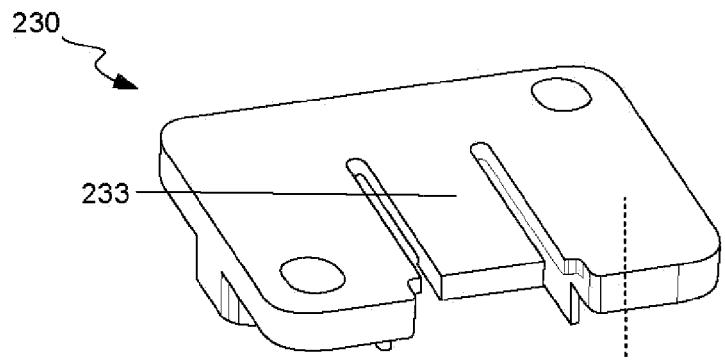
FIG. 11A illustrates in front perspective view an exemplary alternative top bracket for the clamp of FIGS. 9-10 according to an alternative embodiment of the present invention.
Figure 11B:
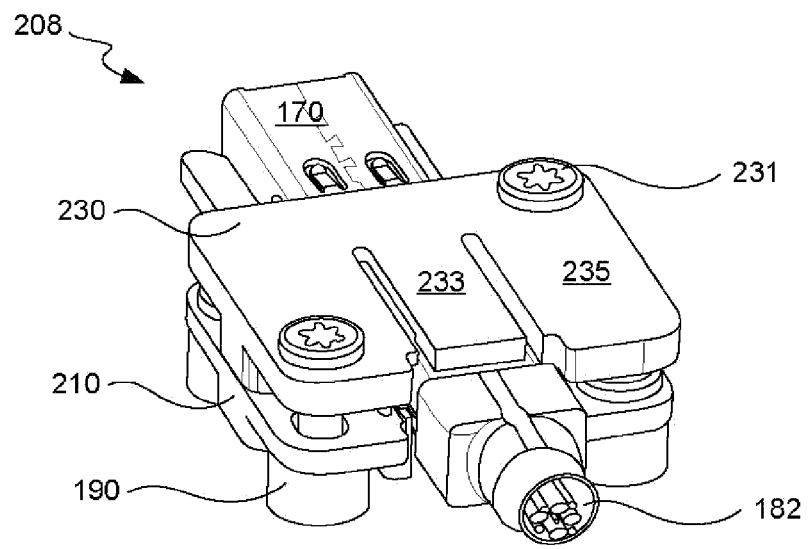
FIG. 11B illustrates in front perspective view the alternative top bracket of FIG. 11A as installed with a respective bottom bracket of a clamp and a ported connection according to the alternative embodiment of the present invention.
Figure 11C:
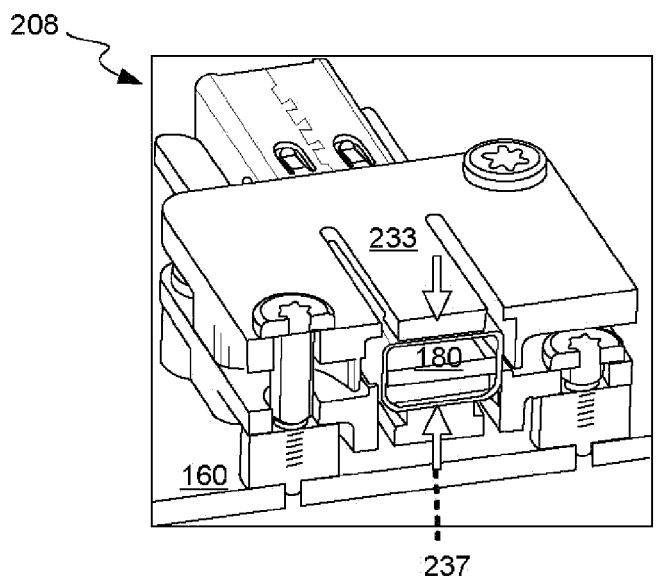
FIG. 11C illustrates in front cross-sectional view the ported connection and installed clamp alternative top bracket of FIG. 11B according to the alternative embodiment of the present invention.

Moving now to FIGS. 11A-C, an exemplary alternative top bracket for the clamp of FIGS. 9-10 is shown in front perspective and front cross-sectional views. Alternative top bracket 230 can be substantially similar to top bracket 220 described above, except that the top portion can be split out to include a cantilever portion 233 situated between side portions 235. Arrangement 208 shows this alternative top bracket 230 as being similarly assembled with a bottom bracket 210 and standoffs 190 to hold the communication connector plug 180, cable 182 and communication port 170 to printed circuit board 160. Such an alternative arrangement 208 can then result in a tighter fit 237 about the top and bottom of plug 180.

This tighter fit 237 is accomplished by the cantilever portion 233 being allowed to flex upward or downward more easily with respect to the relatively less flexible side portions 235. In particular, cantilever portion 233 can be specifically designed and dimensioned to be preloaded and to take up any tolerance stack or gap for all of the parts involved in the clamp, standoffs and board. As such, the datum along the inside of cantilever portion 233 of alternative top bracket 230 will always contact and provide a push down bias on the connector plug 180 regardless of the varying dimensions of the connector plug, bracket parts, standoffs, screws and board.

Methods

Figure 12:
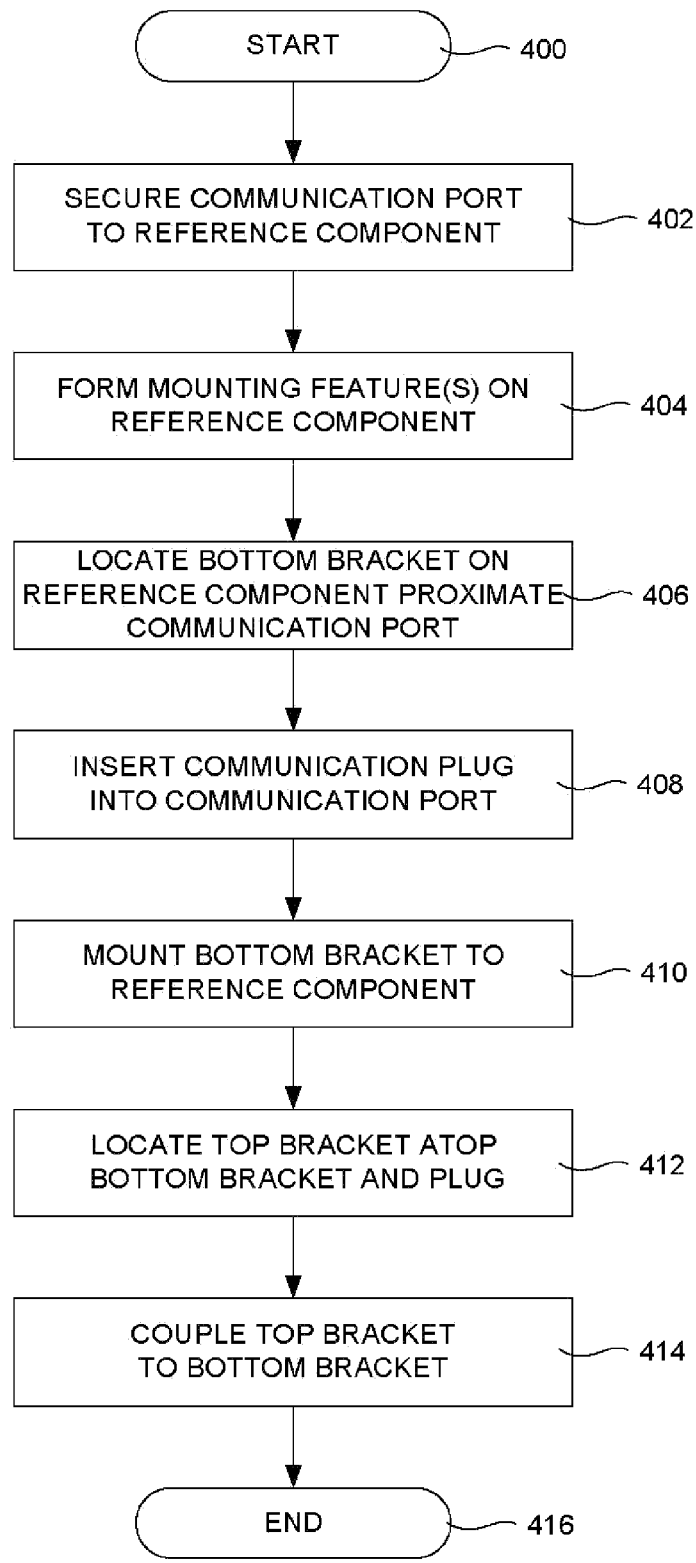
FIG. 12 provides a flowchart of an exemplary method of securing the connection of a communication connector plug inserted into a communication port according to one embodiment of the present invention.

FIG. 12 provides a flowchart of an exemplary method of securing a connection between a cabled communication connector plug inserted into a communication port. It will be understood that the provided steps are shown only for purposes of illustration, and that many other or different steps may be included in the process, as may be desired. Furthermore, the order of steps may be changed where appropriate and not all steps need be performed in various instances. For example, the order of steps 402 and 404 may be reversed, while step 410 may be performed at several different points in the process. Furthermore, it will be appreciated that this exemplary method is for a multiple part clamp, such that steps 406, 410, 412 and 414 can be combined or otherwise altered for a different type of retention component. Other differences may also be possible, and it will be readily appreciated that the described steps and order are not limiting in any way.

After a start step 400, an initial process step 402 involves securing the communication port to a reference component. Again, the reference component can be, for example, a printed circuit board, while the communication port can be soldered into or otherwise affixed, mounted or coupled to the reference component. At a subsequent process step 404, one or more mounting features can be formed on the circuit board or other reference component. Again, such features can simply be holes in the reference component, or can alternatively be hooks, tabs or other suitable features. In addition, one or more mounting standoffs, bosses or other components can serve as or work in conjunction with such mounting features.

A bottom bracket of a multiple part clamp can then be located in place at process step 406. As noted above, such a bottom bracket can be placed atop a plurality of standoffs or other mounting features on a printed circuit board, which position can also simultaneously straddle both sides of the communication port. The communication connector plug can then be inserted into the communication port at process step 408, after which the bottom bracket can be mounted to the reference component at process step 410. Again, such a mounting can involve using a plurality of screws to fasten the bottom bracket to a plurality of standoffs that are affixed to a printed circuit board as the reference component. Such a mounting can also involve pushing the bottom bracket toward the communication port such that a tongue portion of the bracket contacts flush against a chin portion of the communication port, in order to facilitate a more accurate mounted position of components.

A top bracket can then be located or positioned atop both the bottom bracket and the connector plug at process step 412. Again, this positioning can include pushing the top bracket toward the communication port, which can help to ensure that the plug is fully inserted into and engaged with the port. At the next process step 414, the top bracket can be coupled to the bottom bracket. This can similarly include using a plurality of screws or other fastening components to affix the two brackets together, the torquing of which then clamps both brackets onto the top and bottom of the connector plug. Again, such a coupling or mounting can similarly involve pushing the bracket forward against the port such that the tongue engages the chin to facilitate a more accurate mounted position of components. The method then ends at end step 416.

Dual Port Alignment

The foregoing embodiments are all made with respect to securing single ported connections that are entirely within a computing device. There are also many instances where multiple ports can be used, such as where large amounts of data are to be communicated, as in the case of video display communications. Such multiple ports can be arranged in a side-by-side manner, for example. Where such side-by-side or multiple ports are designed as I/O interfaces at a surface of a computing device, space can be at a premium.

In such instances, alignment of dual or multiple side-by-side ports can be important. For example, where space considerations require dual video ports to be side-by-side in a tightly restricted amount of space, any misalignment or offset of one port with respect to the other can cause problems when a user desires to plug connectors into both ports at the same time. This can be particularly problematic where large connector plugs are used, such as multiple side-by-side Thunderbolt™ plugs and corresponding ports. Accordingly, traditional mounting techniques for affixing communication ports to printed circuit boards may not be sufficient to account for the tighter alignments considerations required by such dual ports.

Figure 13A:
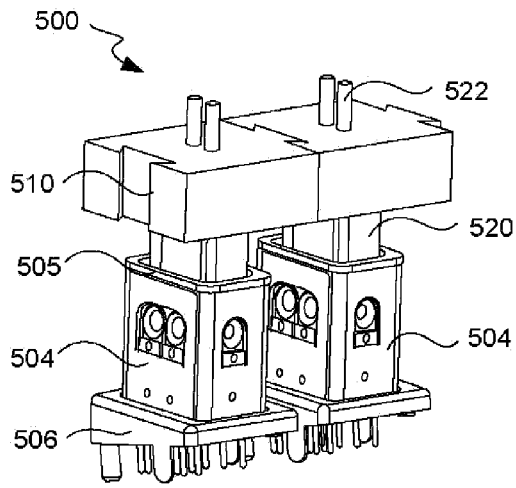
FIG. 13A illustrates in front perspective view side-by-side dual display ports and a corresponding fixture adapted to align the display ports relative to each other according to one embodiment of the present invention.

Turning lastly to FIGS. 13A-13F, side-by-side dual display ports and the use of an exemplary fixture to aid in the accurate mounting and alignment of such ports to a printed circuit board are depicted according to one embodiment of the present invention. FIG. 13A illustrates such ports and a fixture in front perspective view. Arrangement 500 includes two adjacent Mini DisplayPorts 504 having interface openings 505 and their connectors 506 for mounting to an associated printed circuit board (not shown). Although these Mini DisplayPorts are shown for purposes of illustration, it will be readily appreciated that the alignment fixtures and techniques provided herein can be used for any adjacent connection ports 504. In addition, a fixture having adjacent interlocking and moving plates 510, plungers 520 and control pins 522 can be positioned with respect to ports 504.

Figure 13B:
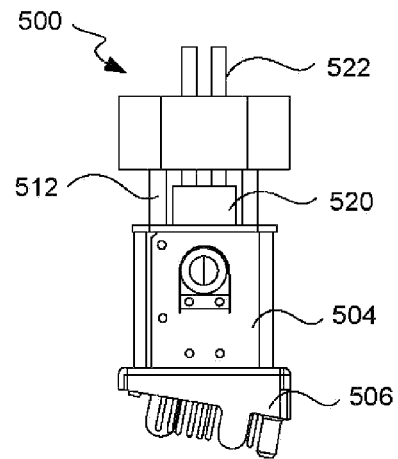
FIG. 13B illustrates in side elevation view the port and fixture arrangement of FIG. 13A according to one embodiment of the present invention.
Figure 13C:
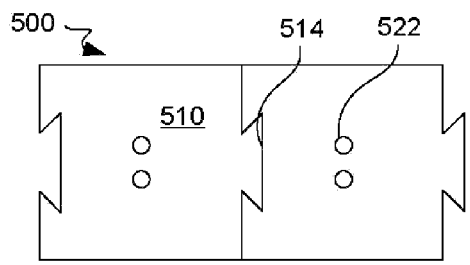
FIG. 13C illustrates in top plan view the port and fixture arrangement of FIG. 13A according to one embodiment of the present invention.

FIG. 13B illustrates in side elevation view, while FIG. 13C illustrates in top plan view the port and fixture arrangement of FIG. 13A for added perspectives. As can be seen with respect to the fixture, moving plates 510 interlock at feature 514 between them, and can independently move up and down with respect to the side-by-side ports 504 using pins 522. Plungers 512 are adapted to enter the ports 504 via the interface openings 505 and engage the port pins for alignment. In addition, one or more datums 512 descending from the moving plates 510 are dimensioned to insert into and tightly fit within the walls of ports 504 to help with proper alignment.

Figure 13D:
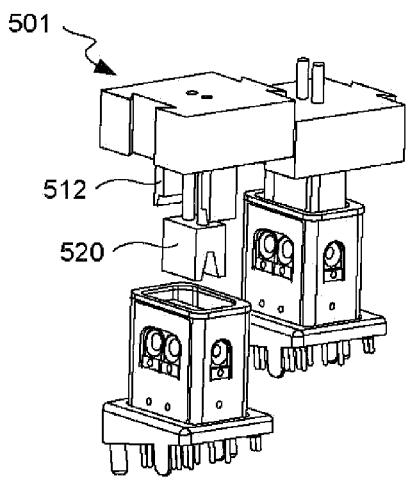
FIG. 13D illustrates in front perspective view the port and fixture arrangement of FIG. 13A with one of the ports being offset with respect to the other according to one embodiment of the present invention.
Figure 13E:
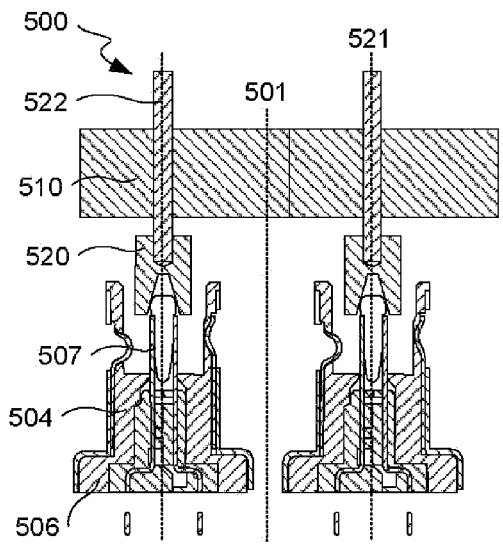
FIG. 13E illustrates in front cross-sectional view the port and fixture arrangement of FIG. 13A according to one embodiment of the present invention.

FIG. 13D shows in front perspective view the port and fixture arrangement of FIG. 13A with one of the ports being offset to the other and one of the plungers being offset with respect to the other. Arrangement 501 depicts such offset ports simply for purposes of illustration. It will be readily appreciated that ports 504 are intended to be installed to a respective circuit board or other reference component (not shown) in a side-by-side and accurately aligned manner. In this regard, the two plate 510, plunger 520 and pin 522 combinations of the fixture can be adapted to move up and down with respect to each other independently, such as by interlocking interface 514 and about axis 501 (FIG. 13E). Preferably, these two fixture combinations are not adapted to move sideways or laterally with respect to each other, such that proper alignment of the ports 504 can be accurately achieved.

Figure 13F:
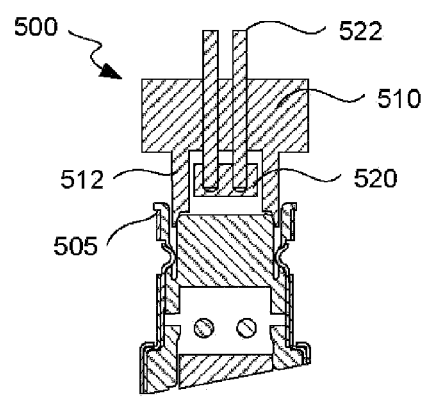
FIG. 13F illustrates in side cross-sectional view the port and fixture arrangement of FIG. 13A according to one embodiment of the present invention.

Still further views of the fixture and port arrangement are provided as a front cross-sectional view in FIG. 13E and side cross-sectional view in FIG. 13F. As shown throughout FIGS. 13A-13F, an accurate alignment of the dual ports 504 can be achieved by using the fixture having plates 510, plungers 520 and pins 522 for each port. It will be readily appreciated that additional ports can be accurately aligned as well by including an additional interlocking plate, plunger and set of pins for each additional port, if desired. In general, each set of pins 522 can be aligned along a vertical axis 521 with respect to the vertical axis of a corresponding port. Such pins 522 can be used to control the up and down motion of each plunger 520 individually. The bottom surface of each plunger 520 can have a particular shape, such as a V-shape, that facilitates the interaction with pins 507 of the port 504, such that the port can be accurately aligned. Descending datums 512 from each of plates 510 can insert into the opening 505 of a respective port 506 and contact the inner wall surfaces thereof, such that the port can be further aligned accurately using such datums.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A computing device, comprising:
a housing adapted to contain a plurality of device components therein;
a printed circuit board (PCB) located entirely within the housing;
a communication port mounted to the PCB;
a cable including a communication connector plug configured to removably connect with the communication port; and
a retention clamp located entirely within the housing, the retention clamp comprising:
a bottom bracket mounted to the PCB, wherein the bottom bracket receives both a portion of the communication connector plug and a portion of the communication port, and
a top bracket mounted over a portion of the bottom bracket and a portion the communication connector plug, wherein the top and bottom brackets are fastened together to restrict movement of the communication connector plug with respect to the communication port.

2. The computing device of claim 1, wherein the communication connector plug and the communication port comprise a Mini DisplayPort connector plug and a Mini DisplayPort, respectively.

3. The computing device of claim 1, wherein the bottom bracket includes a tongue portion having a leading edge that contacts flush against a chin portion of the communication port.

4. The computing device of claim 3, wherein the tongue portion restricts undesired rotation of the bottom bracket when the bottom bracket is mounted to the PCB.

5. The computing device of claim 1, wherein the retention clamp surrounds and contacts the communication connector plug on a top, a bottom and two elongated sides of the communication connector plug.

6. A retention apparatus suitable for securing a cable having a communication connector plug to a communication port, the retention apparatus comprising:
a first bracket configured to mechanically align the retention apparatus with respect to the communication port and to support a portion of the communication connector plug, wherein both the first bracket and the communication port are mounted on a first surface of a printed circuit board (PCB); and
a second bracket configured to be removably coupled to the first bracket and further configured to cooperate with the first bracket to restrict movement of the communication connector plug with respect to the communication port.

7. The retention apparatus of claim 6, wherein the first bracket supports the communication connector plug at a distance above the first surface such that communication connector plug does not contact the PCB.

8. The retention apparatus of claim 6, wherein the first bracket is supported above the first surface of the PCB by a standoff in direct contact with the PCB.

9. The retention apparatus of claim 6, wherein the communication connector plug and the communication port are connected along an axis that is substantially parallel with the PCB.

10. The retention apparatus of claim 6, wherein a portion of the first bracket is mechanically aligned with a portion of the communication port.

11. A retention apparatus suitable for securing a communication connector plug to a connection interface of a communication port, the connection interface of the communication port coupled to and supported a first distance above a first surface of a printed circuit board (PCB) by an elevated portion, the retention apparatus comprising:
a retention clamp mounted on the first surface of the PCB and configured to restrict movement of the communication connector plug with respect to the communicate port, the retention clamp comprising:
a first alignment portion configured to receive a portion of the communication connector plug and to align the communication connector plug with the communication port, and
a support structure configured to support the communication connector plug a second distance above the first surface of the PCB,
wherein the first alignment portion and the support structure cooperate to maintain an orientation of the communication connector plug with respect to the connection interface when the communication connector plug is coupled with the connection interface.

12. The retention apparatus of claim 11, wherein the communication connector plug and the connection interface are connected along an axis that is substantially parallel with the PCB.

13. The retention apparatus of claim 11, wherein the support structure is supported above the first surface of the PCB by a standoff in direct contact with the PCB.

14. The retention apparatus of claim 11, wherein the communication connector plug does not contact the PCB when the communication connector plug is supported by the support structure.

15. The retention apparatus of claim 11, the retention clamp further comprising a second alignment portion configured to mechanically align the retention apparatus with the communication port.

* * * * *